US005633021A

United States Patent [19]
Brown et al.

[11] Patent Number: 5,633,021
[45] Date of Patent: May 27, 1997

[54] APPARATUS FOR MAKING A THREE-DIMENSIONAL ARTICLE

[75] Inventors: Robert B. Brown, Duncan; Charles F. Kirschman, Central, both of S.C.

[73] Assignee: BPM Technology, Inc., Greenville, S.C.

[21] Appl. No.: 326,004

[22] Filed: Oct. 19, 1994

[51] Int. Cl.$^6$ .............. B28B 1/30; G05B 19/19; B29C 41/02
[52] U.S. Cl. .............. 425/375; 364/468.26; 395/80; 901/43; 222/526; 264/407
[58] Field of Search .............. 425/375, 327, 425/385; 364/468; 264/40.7; 901/29, 41, 43; 395/80; 222/526

[56] References Cited

U.S. PATENT DOCUMENTS

| | | | |
|---|---|---|---|
| 4,340,433 | 7/1982 | Crump | 425/378.1 X |
| 4,575,330 | 3/1986 | Hull | 425/174.4 |
| 4,665,492 | 5/1987 | Masters | 364/468 |
| 4,749,347 | 6/1988 | Valavaara | 425/135 |
| 5,031,120 | 7/1991 | Pomerantz et al. | 364/522 |
| 5,038,041 | 8/1991 | Pratt et al. | 219/121.64 |
| 5,059,266 | 10/1991 | Yamane et al. | 156/64 |
| 5,121,329 | 6/1992 | Crump | 364/468 |
| 5,126,529 | 6/1992 | Weiss et al. | 219/121.6 |
| 5,128,235 | 7/1992 | Vassiliou et al. | 430/322 |
| 5,134,569 | 7/1992 | Masters | 364/474.24 |
| 5,136,515 | 8/1992 | Helinski | 364/468 |
| 5,140,937 | 8/1992 | Yamane et al. | 118/695 |
| 5,141,680 | 8/1992 | Almquist et al. | 264/22 |
| 5,149,548 | 9/1992 | Yamane et al. | 425/174.4 |
| 5,192,559 | 3/1993 | Hull et al. | 425/375 X |
| 5,204,124 | 4/1993 | Secretan et al. | 425/145 |
| 5,207,371 | 5/1993 | Prinz et al. | 228/125 |
| 5,216,616 | 6/1993 | Masters | 364/474.24 |
| 5,257,657 | 11/1993 | Gore | 164/46 |
| 5,260,009 | 11/1993 | Penn | 264/40.1 |
| 5,287,435 | 2/1994 | Cohen et al. | 395/118 |
| 5,301,415 | 4/1994 | Prinz et al. | 29/458 |
| 5,301,863 | 4/1994 | Prinz et al. | 228/33 |
| 5,303,141 | 4/1994 | Batchelder et al. | 364/149 |
| 5,402,351 | 3/1995 | Batchelder et al. | 364/468 |

FOREIGN PATENT DOCUMENTS

| | | |
|---|---|---|
| 0 420 614 | 4/1991 | European Pat. Off. . |
| 0 606 627 | 7/1994 | European Pat. Off. . |
| 92/08200 | 5/1992 | WIPO . |
| 92/18323 | 10/1992 | WIPO . |
| 95/05943 | 3/1995 | WIPO . |

*Primary Examiner*—Robert Warden
*Assistant Examiner*—E. Leigh Dawson
*Attorney, Agent, or Firm*—Allen, Dyer, Doppelt, Franjola & Milbrath, P.A.

[57] ABSTRACT

A three-dimensional article making apparatus includes a processor operatively connected to a dispenser and positioner for constructing the article based upon the article defining data. The processor operates the dispenser to construct an enlarged surface of a first article portion to thereby define an enhanced target landing point area for dispensed droplets of build material for constructing a second article portion adjacent the first article portion. The enhanced target landing point area permits a slight misalignment or error that may occur between adjacent article portions. The processor also avoids shadowing during construction of the article by operating the dispenser to construct third and fourth adjacent article portions so that a dispensing path for constructing the third article portion is unobstructed by a previously constructed part of the fourth article portion. Related methods are also disclosed.

31 Claims, 14 Drawing Sheets

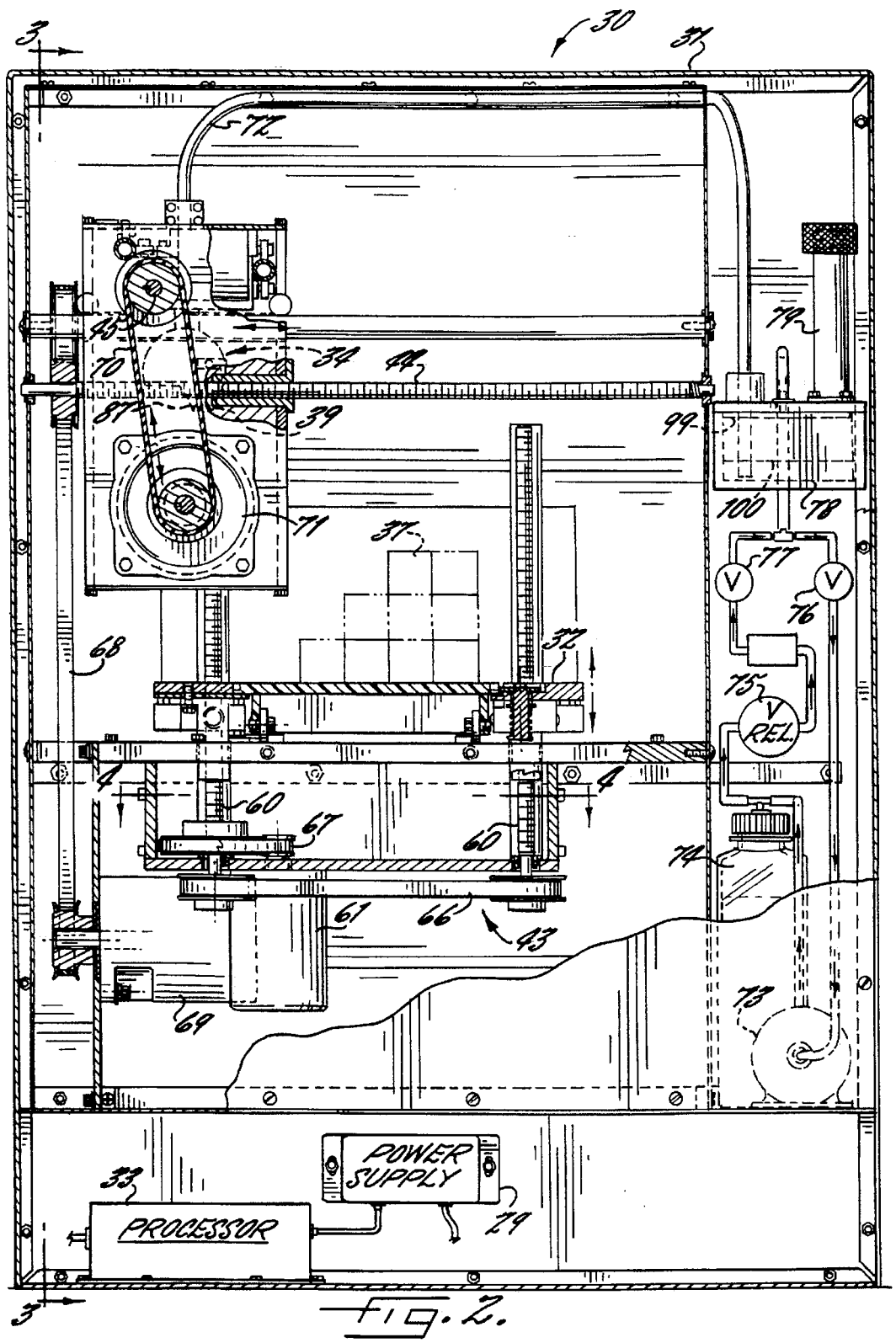

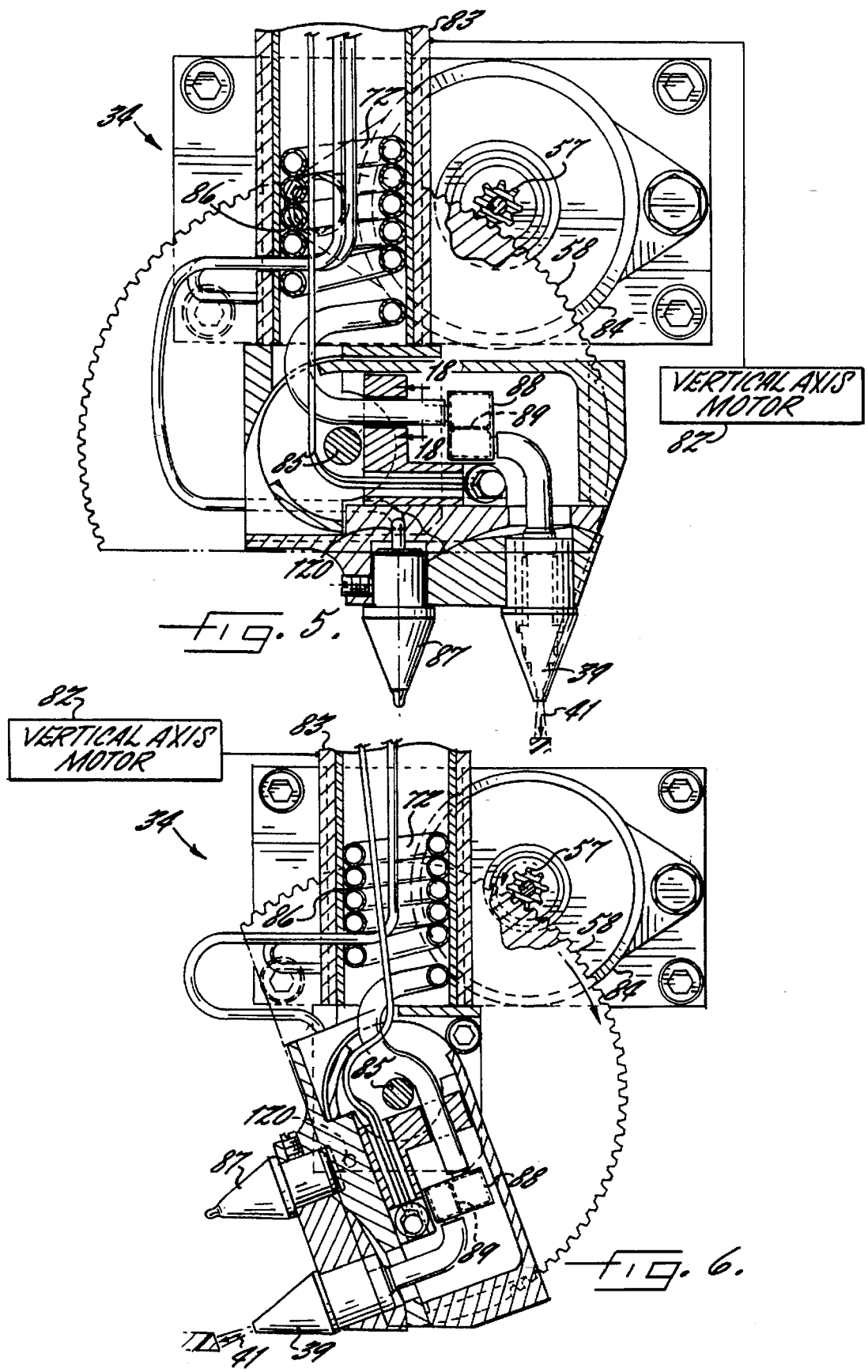

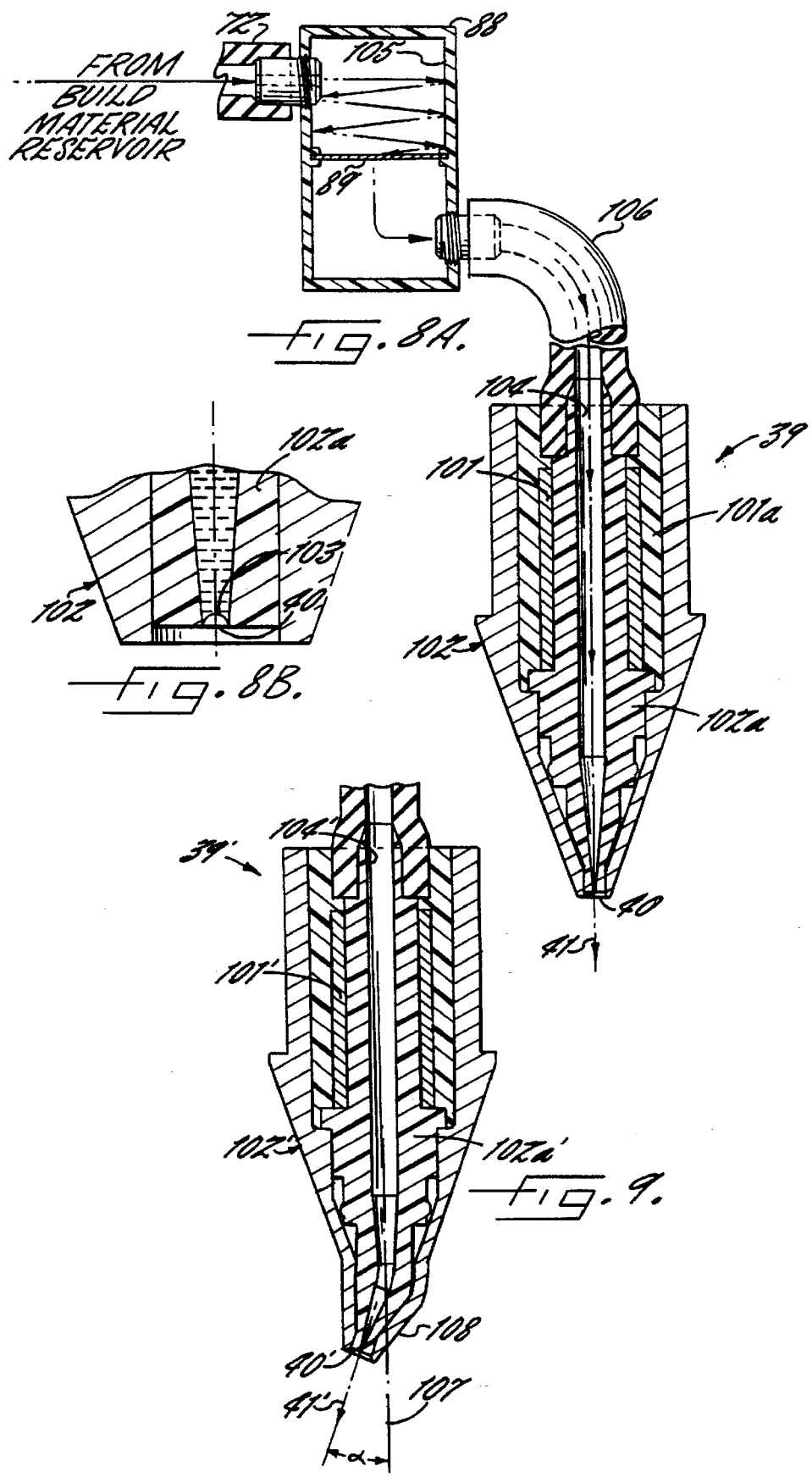

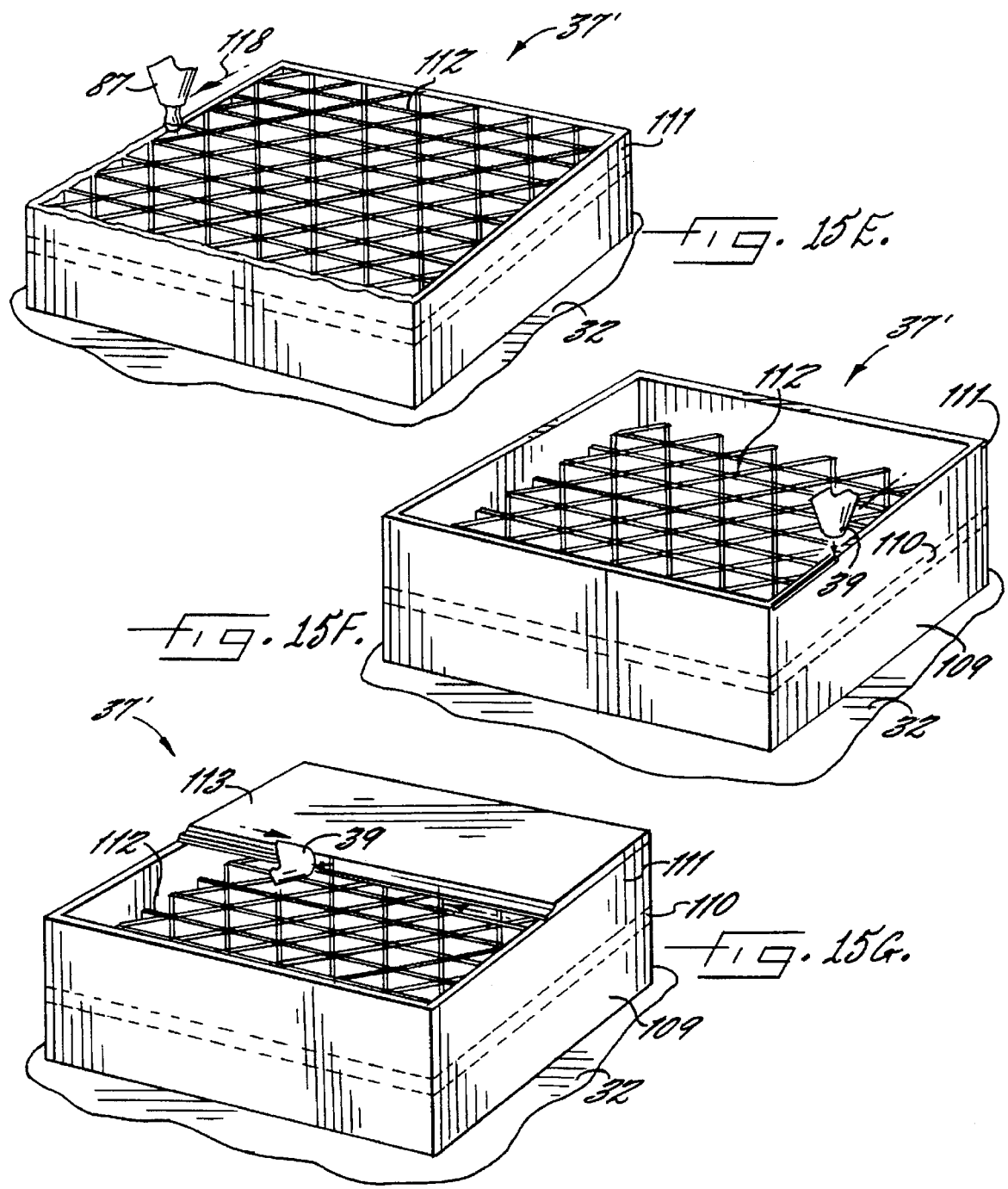

APPARATUS FOR MAKING A THREE-DIMENSIONAL ARTICLE

FIELD OF THE INVENTION

The invention relates to an apparatus and related methods for making a three-dimensional article, and more particularly, to an apparatus and advanced methods for making an article based upon article defining data.

BACKGROUND OF THE INVENTION

In the design and manufacture of a three-dimensional article, it is common practice to first create an initial design of the article and then manually produce a custom prototype or model of the article based upon the initial design. After reviewing the initial design and prototype, design revisions are often made requiring the production of yet another prototype. This process of review and redesign may be repeated a number of times before finding the desired design thereby requiring that a number of preliminary designs and prototypes be produced for a single finished article. Accordingly, the process of designing and prototyping an article may involve considerable time, effort and expense.

Computer aided design (CAD) is commonly used for automating the design process. With the aid of a computer, an operator is able to design a three-dimensional article and display the design on a two-dimensional medium, such as a display screen or paper. In addition, a computer aided milling machine, for example, may be coupled to a CAD system to produce a milled article in response to computer generated CAD data. Unfortunately a milling tool is typically large, expensive and may be limited in the article geometries that may be produced.

Stereolithography is another technology for producing a prototype based upon computer generated coordinate data. An example of stereolithography is disclosed in U.S. Pat. No. 4,575,330 to Hull entitled "Apparatus for Production of Three-Dimensional Objects By Stereolithography." The patent discloses an apparatus producing an article by forming successive cross-sectional laminae of the article at the surface of a fluid medium. The fluid medium is capable of altering its physical state from a fluid to a solid in response to selective stimulation such as by UV radiation; particle bombardment, such as electron beams; chemical reaction; or impinging radiation other than UV radiation. The source of selective stimulation is controlled by a computer in response to computer generated coordinate data.

Stereolithography, however, requires the use of more material than is actually incorporated in the article being produced, and also requires the exact placement of the article being constructed relative to the surface of the fluid medium. The fluids may be toxic and require special handling precautions. In addition, the depth of the layer created when the fluid surface is exposed to the stimulation may be difficult to control, and, accordingly, the resolution of surface features may be difficult to control.

Another apparatus and method for forming three-dimensional articles from a material which is normally solid but flowable when heated is disclosed, for example, in U.S. Pat. No. 5,141,680 to Almquist et al. entitled "Thermal Stereolithography." The apparatus includes a nozzle for dispensing a stream of material which has been heated to the point that it flows. The material is dispensed through the nozzle by applying pressure, and the flow of material can be stopped by a slidable valve or by controlling the pressure. Precise control of the flow of material may be difficult to obtain. Moreover, unsupported portions of the article may be problematic and may collapse unless support is provided. Accordingly, a second support material is provided that must later be removed from the article.

U.S. Pat. No. 5,121,329 to Crump discloses another apparatus wherein a flow of material through a nozzle is used to create a three-dimensional object. In this patent, the flow of material is determined by the size of the outlet orifice, a constant pressure, and the vertical height of the tip of the nozzle. In addition, a spring-loaded ball check valve may assist in metering the flow of material. Again, precise control of this flow may be difficult to obtain, and inaccuracies in the finished article may result.

A significant advance in the art of three-dimensional modeling is disclosed in U.S. Pat. No. 4,665,492 to Masters entitled "Computer Automated Manufacturing Process and System." This patent discloses an apparatus including a repositionable ejection head for ballistically emitting small mass particles or droplets of particulate matter. A machine controller controls a positioner in response to a data file containing coordinate information representing the design of the article being produced. The mass particles are directed to the coordinates of a three-dimensional article as defined by the computer data file, wherein the starting coordinate reference position is described as an origination seed point. The mass particles may include plastic material, a slurry material having water content, charged particles which are electrically deflected, or other materials.

Another method and apparatus for forming three-dimensional solid form objects is disclosed in U.S. Pat. No. 5,257,657 to Gore entitled "Method for Producing A Solid-Phase Object From A Material in the Liquid Phase." According to this patent, droplets of a liquid-phase material are ejected to form a spheroid. As noted in the patent, this method may not work well for glasses and plastics which do not have a set transition temperature at which they become rigid.

Yet another method and apparatus for forming three-dimensional objects is disclosed in U.S. Pat. No. 5,136,515 to Helinski entitled "Method and Means for Constructing Three-Dimensional Articles by Particle Deposition." This patent discloses a device including two jetting heads, or alternately a single jetting head with two feeder lines. In both embodiments, the controller causes fabrication particle material to be ejected as droplets forming the three-dimensional object, while a complementary support structure is created by the ejection of support particles. While this scheme allows the fabrication of layers having various angles, the three-dimensional object must later be separated from the surrounding support material. Accordingly, this device requires the use of more material than is ultimately incorporated in the three-dimensional object. Moreover, two jets and two material supply systems are required, thereby increasing the cost and complexity of the apparatus.

U.S. Pat. No. 5,260,009 to Penn entitled "System, Method, and Process for Making Three-Dimensional Objects" discloses yet another apparatus for forming three-dimensional articles wherein a second or support material is dispensed with each layer of the three-dimensional article as it is formed.

The formation of three-dimensional articles by jetting a photosetting or thermosetting material is disclosed in U.S. Pat. No. 5,059,266 to Yamane et al. entitled "Apparatus and Method for Forming Three-Dimensional Article." A jet sequentially or intermittently jets the photosetting or thermosetting material in a droplet form along a flight path to a stage on which the article is constructed. An exposure unit is then used to cure the deposited material. If a photosetting material is used, the exposure unit is a source of light radiation. A mesh sheet may be required to form an article having a complicated shape.

U.S. Pat. No. 5,140,937 also to Yamane et al. discloses an apparatus for forming a three-dimensional article having plural jets for jetting a thermosetting material and a heat supplying unit for curing the thermosetting material. U.S. Pat. No. 5,149,548, also to Yamane et al., discloses an apparatus for forming a three-dimensional article having a jet head for jetting a two part curable material including microcapsules. This apparatus also includes a microcapsule rupturing unit such as a source of heat, pressure or light radiation. Each of these Yamane et al. patents disclose an apparatus requiring a curing unit to solidify the deposited material.

Other U.S. patents related to three-dimensional modeling are as follows: U.S. Pat. Nos. 5,207,371 to Prinz et al.; 5,301,415 to Prinz et al.; 5,301,863 to Prinz et al.; 5,204,124 to Secretan et al.; 4,749,347 to Valavaara; 5,303,141 to Batchelder et al.; 5,031,120 to Pomerantz et al.; and 5,287,435 to Cohen et al. Despite continuous development in the area of rapid prototype modelling, there is still a need for an apparatus and fabrication methods to quickly and inexpensively make arbitrary three-dimensional articles with a high degree of accuracy.

SUMMARY OF THE INVENTION

In view of the foregoing background, it is therefore an object of the invention to provide an apparatus and associated method to allow a designer to quickly and relatively inexpensively make an arbitrary three-dimensional article with high accuracy.

These and other objects, features, and advantages of the present invention are provided by an apparatus for making a three-dimensional article based upon article defining data that, in one embodiment, includes a processor operatively connected to dispensing means for constructing the article based upon the article defining data, and wherein the processor includes target landing point enhancing means. The dispensing means is preferably a jet including means, such as a piezoelectric element or actuator, for ejecting a controlled volume or droplet of build material responsive to a corresponding firing signal from the processor. The target landing point enhancing means operates the dispensing means to construct an enlarged surface of a first article portion to thereby define an enhanced target landing point area for dispensed droplets of build material for constructing a second article portion adjacent the first article portion.

The enhanced target landing point area permits a slight misalignment or error that may occur between adjacent article portions. If a misalignment or error occurred without the enhanced target landing point area of the present invention, dispensed or ejected droplets of build material intended to form the second article portion may miss their intended target positions. Accordingly, an opening or gap may be formed in the second portion of the article. Any opening or gap may also be propagated throughout the article causing a further loss of accuracy in the finished article.

More particularly, the apparatus also includes a platform for building the article thereon. In addition, the dispensing means preferably includes a build material dispenser, and dispenser positioning means for advancing the dispenser along a predetermined path of travel relative to the platform in three directions and relatively rotatably positioning the dispenser about two axes thereby defining five degrees of freedom of movement for the dispenser relative to the platform. The dispenser positioning means preferably includes: Z-direction positioning means for positioning the dispenser and the platform vertically relative to one another; X–Y positioning means for positioning the dispenser and the platform in an X–Y planar direction relative to one another; flip angle positioning means for rotatably positioning the dispenser relative to an axis generally parallel to the platform; and phi angle positioning means for rotatably positioning the dispenser relative to an axis generally perpendicular to the platform. The processor preferably also includes means for controlling the dispenser positioning means so that the dispenser is located a predetermined distance from respective target landing points of the droplets of build material as the dispenser is advanced along the predetermined path of travel.

The target landing point enhancing means preferably comprises enhancement determining means for determining placement of the enhanced target landing point area based upon the article defining data and also based upon a change in a dispensing or jet firing direction needed to construct the second article portion adjacent the first article portion. In addition, the target landing point enhancing means also preferably includes means for constructing the enhanced target landing point area at a same dispensing direction as for constructing an adjacent surface of the first article portion. In one variation of the invention, the first article portion has a planar surface adjacent the second article portion, and, accordingly, the target landing point enhancing means includes means for enlarging the planar surface of the first article portion along the plane defined by the planar surface.

The processor preferably includes means for forming the second article portion having a predetermined wall thickness. Moreover, the target landing point enhancing means preferably includes means for operating the dispenser to construct the enlarged surface of the first article portion in a range of about 10 to 50 percent of the predetermined wall thickness of the second article portion.

Yet another aspect of the invention is for accounting for shadowing of one portion of the article by another previously constructed portion of the article. In other words, the processor preferably further includes shadow avoiding means for operating the dispenser to construct third and fourth adjacent article portions so that a dispensing path for constructing the third article portion is unobstructed by a previously constructed part of the fourth article portion.

In one embodiment, the shadow avoiding means preferably comprises sequencing means for constructing a part of the fourth article portion to a predetermined extent, then for completing construction of the third article portion and a remaining part of the fourth article portion. In another variation, the third and fourth article portions are constructed from respective first and second dispensing directions, and, accordingly, the shadow avoiding means comprises dispenser direction control means for forming an intersection between the third and fourth article portions by orienting the dispenser to have a dispensing direction between the first and second dispensing directions.

In yet another variation of avoiding shadowing, the apparatus includes normalization means for normalizing a predetermined part of the article during construction thereof, such as to ensure that the dimensions of the article are accurate relative to a predetermined coordinate system. Accordingly, the shadow compensation means comprises normalization control means for operating the normalization means to displace a part of the fourth article portion that would otherwise block a dispensing or jet firing path for constructing the third article portion. The normalization means is preferably thermal normalization provided by a heated body carried and positioned by the dispenser positioning means.

A first embodiment of a method for making a three-dimensional article based upon article defining data preferably includes the steps of: dispensing a plurality of droplets of build material from a build material dispenser and toward target landing points; and constructing the article based upon the article defining data by operating the dispenser to construct an enlarged surface of a first article portion defining an enhanced target landing point area and operating the dispenser to construct a second article portion adjacent the first article portion. The step of constructing the article preferably comprises the step of advancing the dispenser along a predetermined path of travel relative to a platform in three directions and relatively rotatably positioning the dispenser about two axes thereby defining five degrees of freedom of movement for the dispenser relative to the platform.

Another method aspect of the present invention is for making a three-dimensional article based upon article defining data, and while avoiding shadowing. More particularly, the method preferably includes the steps of: dispensing a plurality of droplets of build material from a build material dispenser and toward target landing points; and constructing the article based upon the article defining data by operating the dispenser to construct first and second adjacent article portions so that a dispensing path for constructing the first article portion is unobstructed by a previously constructed part of the second article portion to thereby avoid shadowing of construction of the first article portion by a previously constructed part of the second article portion.

BRIEF DESCRIPTION OF THE DRAWINGS

FIG. 2 is a sectional view of the apparatus taken along lines 2—2 of FIG. 1.

FIG. 5 is a greatly enlarged side view, partially in section, of a portion of the apparatus according to the invention illustrating the build material jet head positioned to have a vertical firing direction.

FIG. 6 is a greatly enlarged side view, partially in section, of a portion of the apparatus according to the invention illustrating the build material jet head positioned to have a near horizontal firing direction based upon rotation about a horizontal axis or flip angle positioning.

FIG. 8A is an enlarged sectional view of the build material jet and connecting conduit according to the invention.

FIG. 8B is a greatly enlarged sectional view of the tip portion of the build material jet as shown in FIG. 8A.

FIG. 9 is an enlarged sectional view of another embodiment of a build material jet illustrating a canted tip according to the invention.

FIGS. 15A to 15L are schematic perspective view of the article being constructed according to the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout and prime notation is used to indicate similar elements in alternate embodiments.

Figure 1:
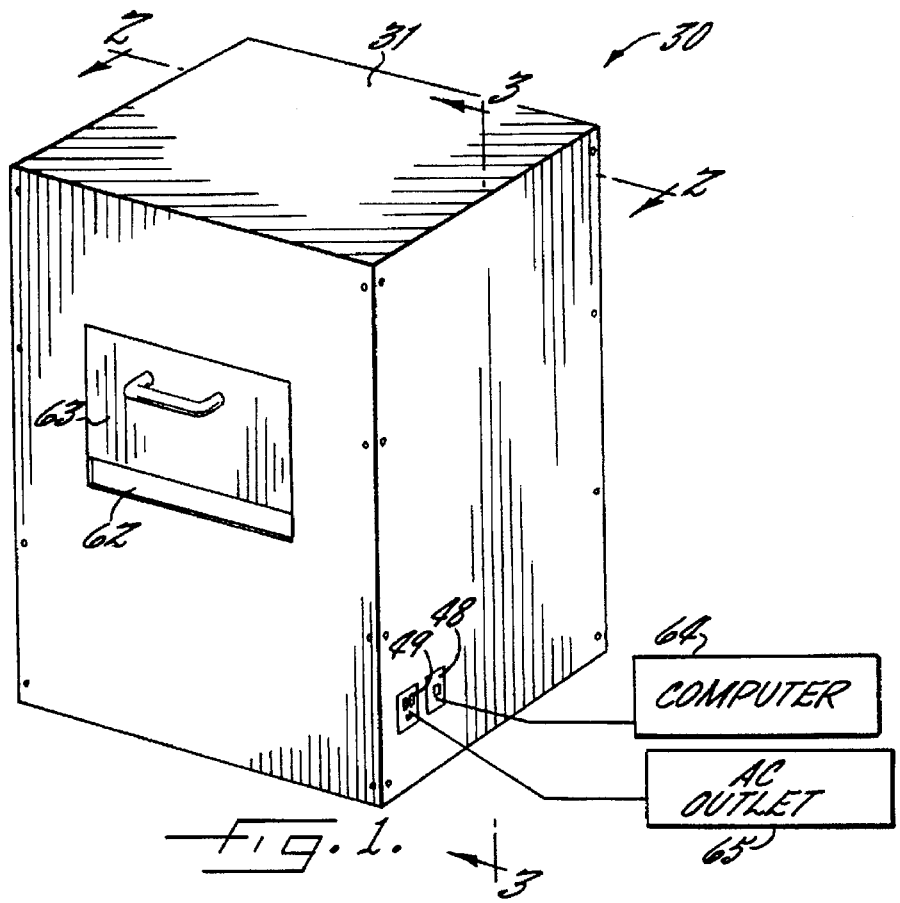
FIG. 1 is a perspective view of the apparatus for forming three-dimensional articles according to the invention.
Figure 4:
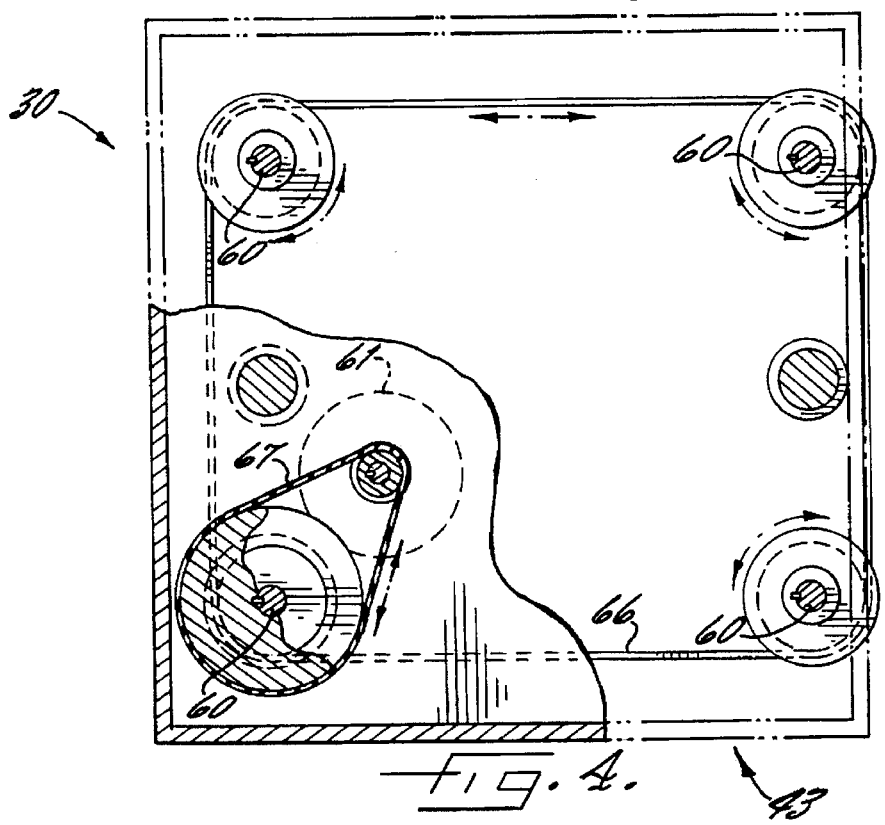
FIG. 4 is a sectional view of the apparatus taken along lines 4—4 of FIG. 2.

As illustrated in FIG. 1, the three-dimensional article manufacturing apparatus 30 according to the invention includes a generally rectangular housing 31. The housing includes an access opening 62 closed by a sliding door 63. A power port 49 facilitates electrical connection to an external power source such as from an AC outlet 65 shown in schematic form. A computer port 48 allows connection to an external computer 64 also shown in schematic form. An external computer 64, such as a work station or personal computer, is used to generate a digital data file containing the three-dimensional coordinate data defining an article or model to be built. For example, the data may be from an STL file which defines the article in triangular facets, as would be readily understood by those skilled in the art.

In addition, it will be understood by those having skill in the art that the data file may be transferred to the apparatus by a transferable memory medium such as a magnetic disk or tape, or a microelectronic memory, not shown. Accordingly, the apparatus 30 may be adapted to receive coordinate data from any number of sources having the appropriate electronic data format. If data is transferred by a transferable memory medium, for example, the apparatus 30 may include a disk drive, a tape reader, or other means for reading electronic data from a transferrable memory medium.

As illustrated in FIG. 2, the apparatus 30 includes a processor 33 which receives the digital data file and translates the coordinate data therein to control signals, as described further herein. The apparatus 30 also includes a power supply 29.

Figure 7:
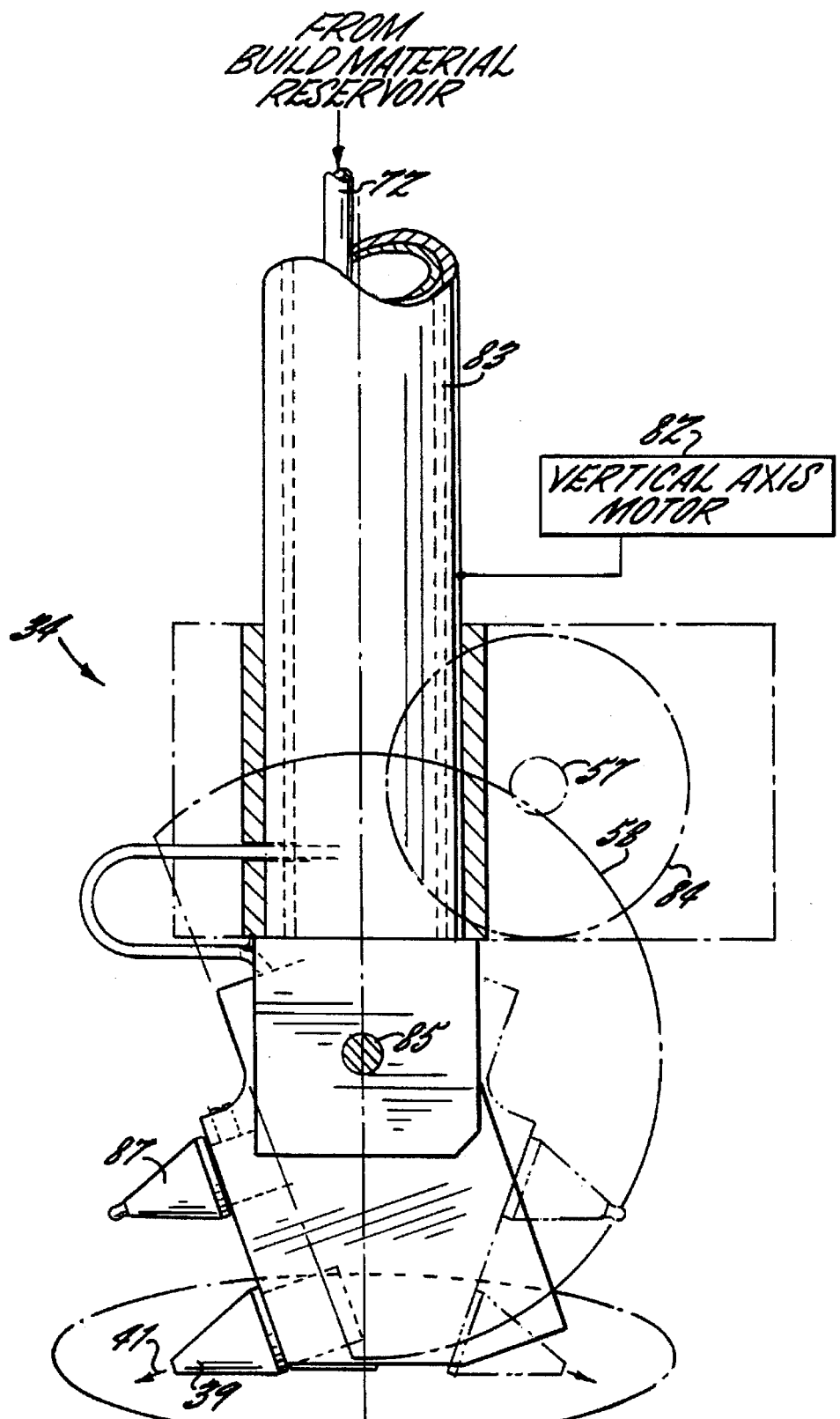
FIG. 7 is a schematic side view of the build material jet head as shown in FIGS. 5 and 6 illustrating rotation about a vertical axis, that is, phi angle positioning.

The apparatus 30 includes a platform 32 on which the article 37 is built, and a ballistic jetting head 34 (FIGS. 5–7). Droplets of liquid build material are ballistically jetted from a piezoelectric jet 39 carried by jetting head 34 to the platform 32 in order to construct the article 37. The build material is normally solid when at the temperature of the interior of the apparatus. The build material is heated to maintain the build material in a liquid state. Accordingly, heated liquid droplets of build material are jetted from the jetting head 34 to an intended landing position on either the platform 32 or a portion of previously jetted build material. On contact with the platform or previously jetted build material, the heated liquid droplets cool and solidify.

The piezoelectric jet 39 may also be positioned relatively close to the target position so that the build material may, in a sense, not be considered as traveling ballistically. Accordingly, the terms ejected and jetted are also used herein and describe a relatively small gap or no gap. The illustrated piezoelectric jet 39 is but one embodiment of a dispenser for dispensing build material in metered quantities and to precise target landing positions. It being readily understood by those of skill in the art, that other types of build material dispensers are also contemplated by the invention that can meter build material and accurately deliver it to a target position. Moreover, the term droplet as used herein is intended to cover individual or discrete volumes of build material that may be ejected, for example, by the piezoelectric jet 39. In addition, the term droplet is also intended to cover a volumetrically modulated stream of build material, wherein small quantities or volumes of build material may be connected to adjacent volumes without becoming discrete entities, such as because of a relatively small gap or because of the speed of dispensed build material, for example.

Figure 3:
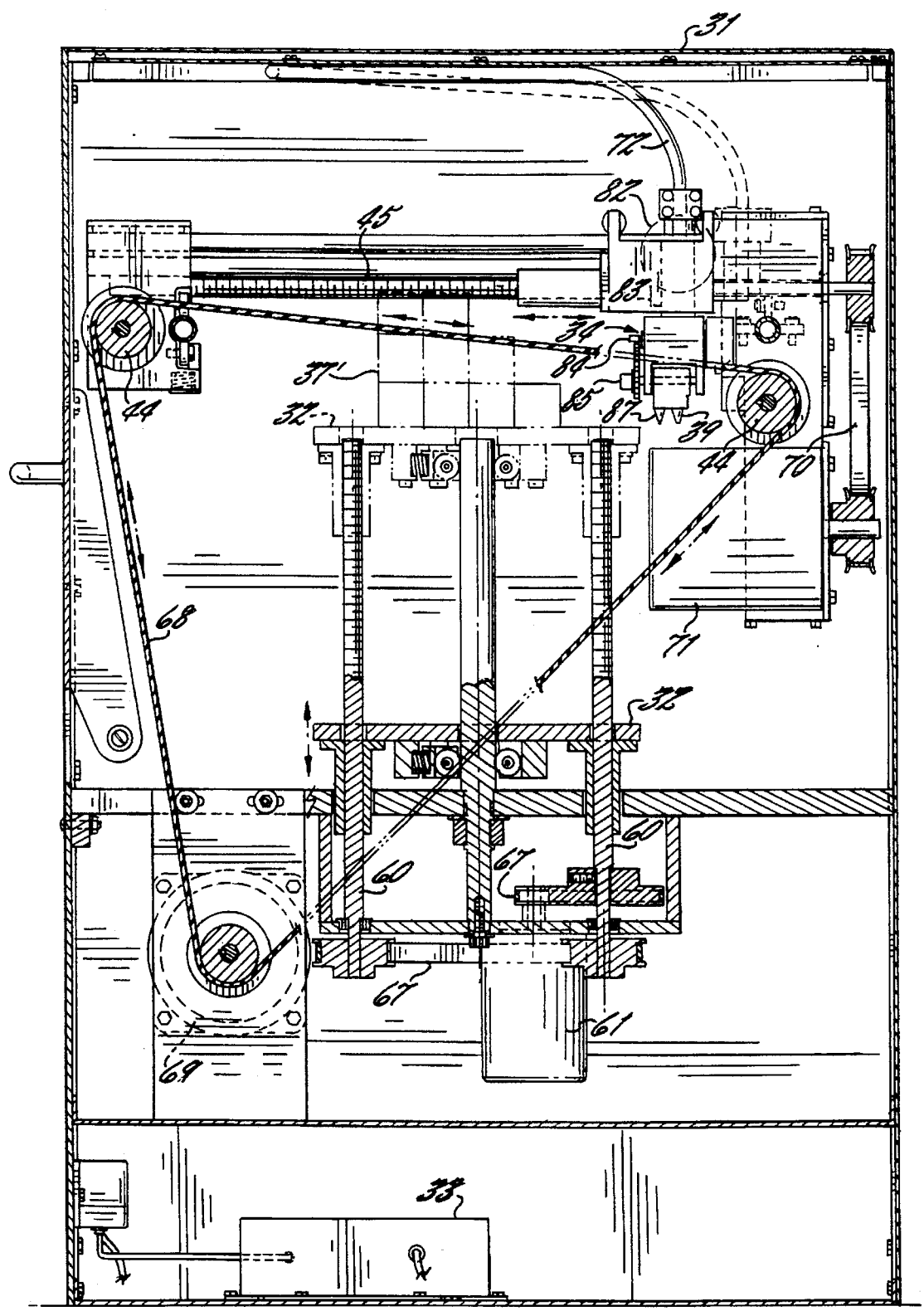
FIG. 3 is a sectional view of the apparatus taken along lines 3—3 of FIG. 2.

In a preferred embodiment, the apparatus 30 includes positioning means for moving the ballistic droplet jetting head 34, including the piezoelectric jet 39 and the thermal normalization means, such as the illustrated heated body 87 in relation to the platform 32. Orthogonal drive shafts facilitate the movement of the jetting head 34 in the X- and Y-directions relative to the platform 32. As illustrated in FIGS. 2 and 3, a pair of X-axis drive shafts 44, which are driven by X-axis motor 69 and X-axis drive belt 68, facilitate movement of the jetting head 34 in the X-direction. Y-axis drive shaft 45, which is driven by Y-axis drive motor 71 and Y-axis drive belt 70 facilitates movement of the ballistic droplet jetting head 34 in the Y-direction. As will be understood by those having skill in the art, movement of the jetting head 34 in the X–Y planar direction may also be provided by an r/θ positioner including an arm adapted for radial movement at an angle θ, and a positioner for positioning the jet at a radius, r, along the arm.

In the illustrated embodiment, relative movement in the Z-direction is provided by a Z-axis positioner 43 which moves the platform 32 up and down in the Z-direction. The Z-axis positioner includes vertical drive shafts 60 which engage the platform 32. The drive shafts 60 are driven by the vertical drive motor 61 and vertical drive belts 66 and 67.

Referring more particularly to FIG. 2, liquid build material is supplied from a build material reservoir 78 to the jetting head 34 through the build material delivery hose or conduit 72. The build material reservoir 78 and the delivery conduit 72 both include means for heating the build material so that it remains in a liquid state. In a preferred embodiment, both the build material reservoir 78 and the delivery conduit 72 include an electrical heating element. The build material reservoir 78 also includes a fill tube 79, and a connection to a pneumatic system for applying either vacuum or pressure to the liquid build material. The pneumatic system includes a pump 73, an accumulator 74, a pressure regulator 75, a purge valve 76, and a fill valve 77.

A relatively constant level of liquid build material is maintained in the build material reservoir 78, so that the surface level of the liquid build material in the build material reservoir 78 is maintained at a relatively constant elevation with respect to the piezoelectric build material jet 39. Dashed lines represent a nearly full liquid level 99 and a nearly empty liquid level 100 of build material in the build material reservoir 78. In preferred embodiments, the jet 39 is situated above the surface level of the liquid build material, such as about 1 to 3 inches above the surface level of the liquid build material, to thereby maintain a negative meniscus, that is, having a concave shape at the orifice of the piezoelectric jet 39. Alternatively, a vacuum could be applied to the liquid build material, such as by coupling a vacuum source to the reservoir 78. The negative meniscus increases the accuracy and uniformity of successive ballistically jetted droplets and also reduces undesirable accumulation of build material adjacent the orifice of the jet 39.

As illustrated perhaps best in FIGS. 5 and 6, the ballistic droplet jetting head 34 includes means for rotating the piezoelectric jet 39 and the heated body 87 about a horizontal axis or to a desired flip angle. The axis is defined by a horizontal shaft 85 which is driven by an associated motor 84 through drive gears 57 and 58. Accordingly, the firing direction 41 may be adjusted from vertical, as shown in FIG. 5, to near horizontal as shown in FIG. 6. FIGS. 5 and 6 also further illustrate the positioning means which rotates the jetting head 34 about a vertical axis on shaft 83 for rotation to a desired phi angle of rotation. This rotation is powered by vertical axis rotation motor 82 shown in schematic form.

The jetting head 34 preferably carries both the piezoelectric jet 39 and the heated body 87. Both of these elements are heated to a temperature above the melting point of the build material. This heat may be generated by an electrical heating element. In a preferred embodiment, an electrical heater, such as a resistive wire 120, is operatively connected to the heated body 87. Accordingly, the jet 39 receives heated liquid build material from the delivery hose 72 and maintains the build material in a liquid state prior to jetting. As will be discussed in greater detail with regard to FIG. 15E, the heated body 87 is used to periodically normalize surface portions of a partially completed wall.

Liquid build material is supplied to the jet 39 through the flexible build material delivery conduit 72. The conduit 72 is formed into a spiral coil 86 within the vertical shaft 83 to enable rotation of the ballistic droplet jetting head 34 without restricting the flow of build material through the conduit and without requiring a rotatable joint and associated seal. FIG. 7 illustrates rotation of the ballistic droplet jetting head 34 about the vertical shaft 83. The build material delivery conduit 72 enters the jetting head through the shaft 83. By rotating the shaft 83, the entire jetting head 34, including the jet 39 and the heated body 87, may be rotated 360 degrees about a vertical axis by the vertical axis motor 82.

The build material flows from the conduit 72 through a baffle 88 and a filter 89 to the jet 39, and out of the orifice 40 of the jet as shown in FIG. 8A. The heated liquid build material from hose 72 enters baffle 88 before passing on to the jet 39. The baffle 88 provides two 90 degree bends in the path of the flow of build material. Accordingly, acoustic waves generated upstream from the baffle 88 are dissipated as they strike wall 105 of the baffle. In other words, the baffle 88 is beneficial to prevent movement of the head from breaking the negative meniscus at the orifice and also is useful during filling to prevent generation of air bubbles. The filter 89 prevents any contaminants from clogging the narrow passageway of the jet 39 and also provides a further reduction in the acoustic waves. The build material passes from the baffle 88 through the tubular connection 106 to the piezoelectric jet 39.

A build material passage 104 within the piezoelectric jet 39 provides fluid communication between the baffle 88 and the orifice 40. As discussed above, a heating element, such as an electrical resistance wire, may be used to maintain the build material in a liquid state as it passes from the conduit 72 to the baffle 88, tubular connection 106, and jet 39.

The orifice 40 of the jet 39 is maintained at a predetermined elevation above the surface level of liquid build material in the build material reservoir 78 in the illustrated embodiment. Accordingly, a predetermined negative pressure is exerted upon the liquid build material at the orifice 40. As illustrated in FIG. 8B, orifice 40 has a predetermined diameter such that the liquid build material maintains a negative meniscus 103 at the orifice 40 under the influence of the negative pressure. Accordingly, the negative meniscus increases the accuracy and uniformity of successive ballistically jetted droplets and also reduces undesirable accumulation of build material adjacent the orifice 40 of the jet 39.

The piezoelectric jet 39 includes a hollow body 102 including a plastic insert 102a defining a build material flow passage 104, and a containing a piezoelectric element 101, in turn, secured within the body by an epoxy 101a. Upon application of an electric signal to the piezoelectric element 101, the piezoelectric element either contracts or expands depending on the polarity of the signal. In response, an acoustic wave is generated in the liquid build material located in the build material flow passage 104. This acoustic wave is transmitted through the liquid build material to the negative meniscus 103 at the orifice 40. As a result of the acoustic wave, a droplet of heated liquid build material having a predetermined volume is jetted or ejected from the orifice 40 in firing direction 41 and at a predetermined velocity. The volume and velocity of the droplet are functions of the diameter of the orifice; the size of the piezoelectric element 101; the intensity and polarity of the electrical signal; and the temperature, surface tension and viscosity of the liquid build material.

In preferred embodiments, it has been found that stable operation of the piezoelectric jet 39 can be sustained at frequencies of up to 12 KHz. Accordingly, the piezoelectric jet 39 is capable of firing 12,000 droplets per second wherein each droplet has a predetermined volume, velocity and firing direction. Other jetting means are also contemplated by the invention as would be readily understood by those skilled in the art. The jet 39 may also be operated to jet droplets in relatively quick succession, that is, in bursts of multiple droplets, so that the droplets in each burst collectively coalesce or solidify at an intended landing position as described in copending patent application Ser. No. 08/325, 889 and assigned to the present assignee, the entire disclosure of which is incorporated herein by reference.

The build material typically melts at a temperature of from about 50° C. to 250° C., cools quickly and adheres to itself, and has a low rate of shrinkage. Such a build material preferably comprises a solution of a resin having a hydroxyl number of from about 5 to 1000, and a molecular weight greater than about 500, dissolved in at least one primary aromatic sulfonamide preferably having a melting point greater than about 25° C. The rheology of the build material is preferably such that a droplet remelts portions of deposited material so as to form a flowable bead.

With respect to the resin portion of the build material, Applicants do not wish to be bound by any one theory, but believe that a resin having hydroxyl functionality, as defined by hydroxyl number, through hydrogen bonding, holds together the droplet after jetting through the jetting head. The upper limit of hydroxyl number (i.e., 1000) is important in that the higher the hydroxyl number, the higher the heat capacity of the resin, and the resin cools slower. Slower cooling is undesirable in that the build material tends to sag if it cools slowly as the article is being built. Exemplary resins include polyester resins, phenolic resins, polyamides, vinyl ester resins, polyurethanes, amino resins, melamine resins, urea resins, epoxy resins, and naturally-derived polymers such as coumarin-indene, shellac, protein and celluosics (e.g., ethyl cellulose, ethyl hydroxy ethyl cellulose, nitro cellulose, etc.), and mixtures thereof.

Suitable polyester resins include practically any esterification product of a polybasic organic acid and a polyhydric alcohol. Polyester resins can also be derived from the esterification of a polycarboxylic acid or anhydride with a polyhydric alcohol. Suitable phenolic resins include practically any reaction product of an aromatic alcohol with an aldehyde. Particularly preferred, are the phenolic resins prepared by the reaction of phenol with formaldehyde. Suitable vinyl ester resins include practically any reaction product of an unsaturated polycarboxylic acid or anhydride with an epoxy resin. Exemplary epoxies include virtually any reaction product of a polyfunctional halohydrin, such as epichlorohydrin, with a phenol or polyhydric phenol. Specific resins include acrylics, styrene-acrylic copolymers and styrene-allyl alcohol copolymers. Typically, the build material includes about 1 to 50 percent of the resin, preferably about 5 to 30 percent, and more preferably about 5 to 15 percent, by weight of the resin.

With respect to the primary aromatic sulfonamide, it is believed that the primary aromatic sulfonamides provide the necessary self adhesion properties to the build material. Suitable aromatic sulfonamides are preferably primary $C_1$ to $C_{15}$ benzenesulfonamides, and most preferably the substitution is alkyl and is at the para position. Exemplary primary aromatic sulfonamides include p-n-ethylbenzenesulfonamide, p-toluenesulfonamide, p-methoxybenzenesulfonamide, p-n-nonylbenzenesulfonamide, p-n-butylbenzenesulfonamide, and mixtures thereof. Typically the build material includes about 1 to 50 percent, preferably about 70 to 90 percent, and more preferably about 75 to 90 percent by weight of one or more of the aromatic sulfonamides. Particularly preferred is a 50/50 mixture of p-toluenesulfonamide and p-n-ethylbenzenesulfonamide.

The build material can include antioxidants (e.g., Ultranox 626 available from Borg Warner Chemicals, Inc.), flexibilizers, magnetic particles, pigments, and fluorescent agents, and other additives, the addition of which is within the skill of one in the art. Dyes can be added to the build material. Suitable dyes include FD & C Blue #1, Neozapon Red 492, Savinyl Black RLS and the like. Another additive could be a secondarily reactive organic compound such as one activated by exposure to UV light. These compounds can be used to provide an article which can be hardened so as to be unmeltable or machinable. Typically, the build material includes from about 1 to 10 percent by weight of the various additives.

Suitable build materials are further described in commonly assigned copending U.S. patent application Ser. No. 08/325,694, the entire disclosure of which is incorporated herein by reference. In addition, other techniques for jetting or ejecting build material are further described in commonly assigned copending patent application Ser. No. 08/326,015.

An alternative embodiment of a jet 39' is shown in FIG. 9 having a firing direction 41' oriented at an offset angle α relative to the jet axis 107 defined by the cylindrical body 102'. This orientation is obtained by providing a tip 108 which is curved or canted at the angle offset from the body. The other elements are indicated by prime notation and are similar to those elements described in the first embodiment. This second embodiment has the advantage of allowing the firing direction 41' to be close to horizontal without interference with a layer of the article being constructed. The wider body 102 portion of the jet 39 containing the piezoelectric element 101 might otherwise come into contact with previously jetted layers of build material. In a preferred embodiment, the angle α is not less than 5° or more preferably not less than 20° as illustrated.

Figure 10:
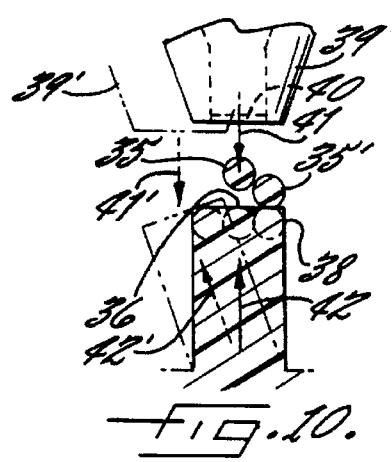
FIG. 10 is a schematic sectional view of the build material jet and adjacent wall portion of the article being constructed illustrating a generally vertical build direction.
Figure 11:
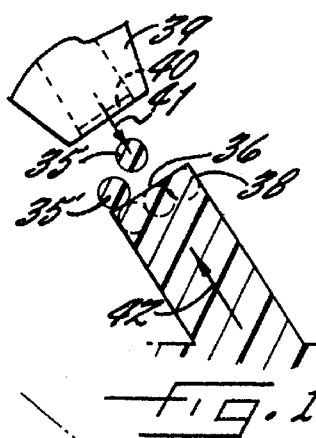
FIG. 11 is a schematic sectional view of the build material jet and adjacent wall portion of the article being constructed illustrating a build direction along the axis of the jet.
Figure 12:
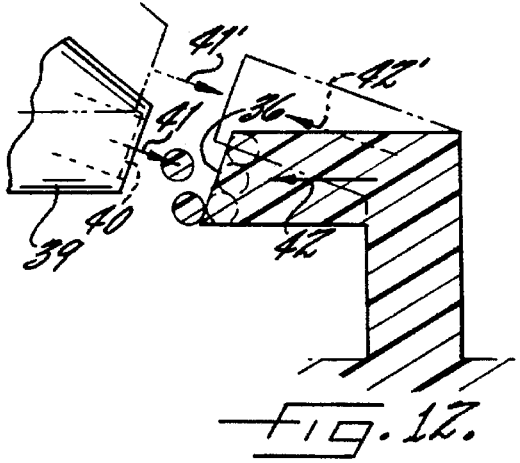
FIG. 12 is a schematic sectional view of the build material jet and adjacent wall portion of the article being constructed illustrating a generally horizontal build direction.

In FIGS. 10, 11 and 12 there are illustrated the formation of walls of an article oriented at various angles. In each of these figures, a cross-section of a wall is schematically illustrated and the wall is 3 droplets thick, it being understood that the burst mode of operation may also be used in the present invention as described above in which case the wall is three bursts thick. In this preferred embodiment, the 3 droplet wall thickness provides a balance of strength, stability, and conservation of time and material. Now referring more particularly to FIG. 10, a vertical wall is being formed and the piezoelectric jet 39 is positioned directly above the wall. Upon application of an electrical pulse to the piezoelectric element, a heated liquid droplet of build material 35 is jetted from the orifice 40 in the firing direction 41. The liquid droplet 35 will contact the wall at the intended landing point 36. Upon contact, the liquid droplet will bond with the previously solidified wall portion. Because the wall is 3 droplets wide, 3 droplets will be required to form a horizontal layer of the wall. Previously jetted pass or layer 38 is indicated by dashed lines schematically representing the droplets which formed the previous layer. In this illustration, the firing direction 41 and the build direction 42 are aligned.

Since the jet 39 may be accurately positioned and aligned with an intended landing point 36, the firing direction and build direction need not be aligned. Moreover, because of the adherence of the build material, it is possible to build walls having a build direction 42' as much as 45°, and more preferably 25° from vertical while maintaining the jet 39' and firing direction 41' in a vertical orientation as illustrated by the dashed lines of FIG. 10.

FIG. 11 illustrates the formation of a wall having a non-vertical build direction wherein the build direction 42 and the axis of the jet 39, that is, its firing direction 41 are aligned. This arrangement may be preferred in the construction of walls having build directions 42 which are in the range of from vertical down to about 5° from horizontal.

FIG. 12 illustrates the formation of walls having a build direction 42 in the range of horizontal to about 45° from horizontal. It is not desirable to bring the firing direction 41 of the jet 39 below 5° and, more preferably 20°, from horizontal because the jet would contact previously jetted portions of the article. Accordingly, for horizontal walls, it is preferable to fire the piezoelectric jet 39 at orientations such that the firing direction 41 is at least 5°, and more preferably 20°, from horizontal as may be readily achieved with the embodiments of the jet 39 according to the invention. Accordingly, with the build material jet 39 and jetting head 34 positionable in five degrees of freedom, horizontal walls can be produced without the need for separate support material. In certain article geometries, struts may be formed which can be later removed from the article as would be readily understood by those skilled in the art.

Figure 13A:
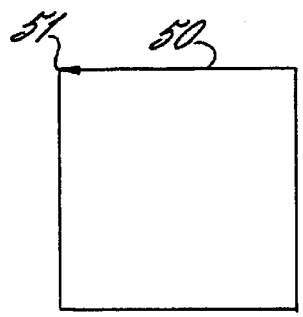
FIGS. 13A to 13C are schematic plan views of a wall portion of the article being constructed according to the invention.
Figure 13B:
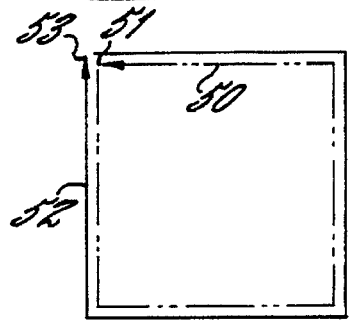
Figure 13C:
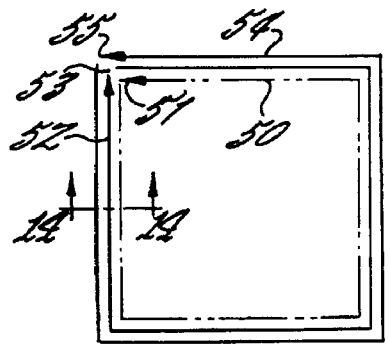

In FIGS. 13A–13C, there is illustrated a preferred order of firing droplets of build material so as to minimize irregularities in the formation of a layer or pass on a wall. In FIG. 13A, a first linear segment or wall portion is formed by advancing the build material delivery jet along the first path 50 in a first direction 51. As the jet is advanced, ballistic droplets of build material are jetted to form the first segment on top of the existing wall. As shown in 13B, the build material delivery jet is then advanced along a second path 52 to construct a second segment side-by-side with the first segment and in a second direction 53 opposite the first direction 51. In FIG. 13C, the jet is advanced along a third path 54 side-by-side with the second path 52 in a direction 55 opposite the second direction 53. Accordingly, a third segment is formed side-by-side with the second segment. Although linear segments are illustrated, arcuate or curved segments may also be similarly formed according to the invention.

Figure 14:
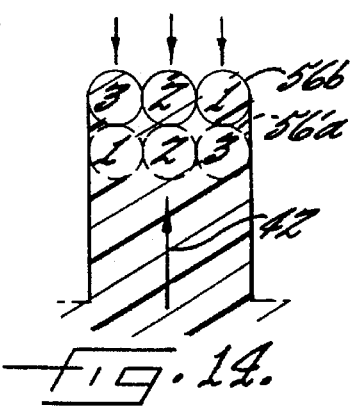
FIG. 14 is a greatly enlarged sectional view taken along lines 14—14 of FIG. 13C.

FIG. 14 illustrates another aspect of the invention for enhancing build uniformity and accuracy in the article. In a next successive layer of the article, the respective segments 56b are laid down in an opposite order from the underlying segments 56a.

In the formation of a wall portion or segment, irregularities may occur at the beginning and end of the segment. For example, the beginning of the segment may be relatively thick while the end may be relatively narrow. These differences in thickness may result from the acceleration and deceleration of the jet as it starts and stops movement or from surface tension effects of the build material. By altering the direction of advancement of the jet when forming side-by-side segments, these irregularities may be significantly reduced.

Figure 15A:
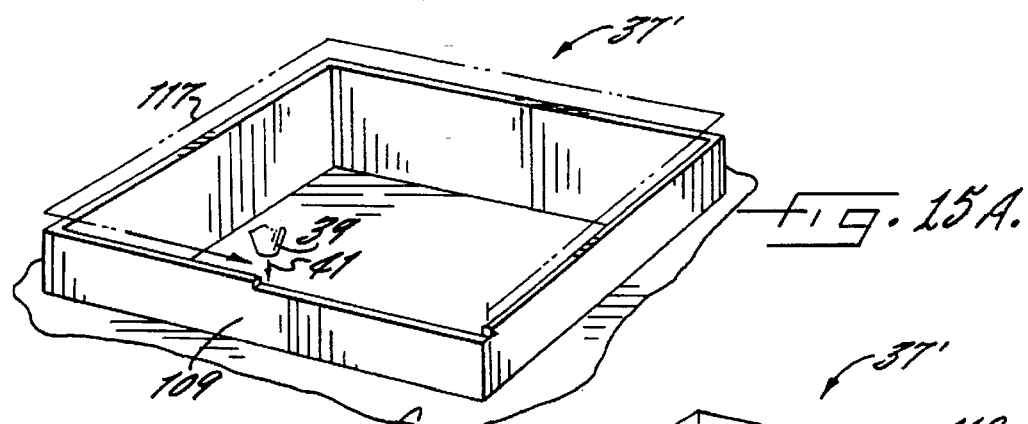

In FIGS. 15A–L, there is illustrated the formation of a three-dimensional article 37' having unsupported features. As previously discussed, liquid build material is first jetted from the piezoelectric jet 39 to the platform 32 and then to previously jetted build material thereby forming successive layers. As illustrated in FIG. 15A, a release structure 109 may first be constructed to facilitate removal of the finished article from the platform 32. This structure 109 comprises a plurality of walls which have reduced thickness in the illustrated embodiment. In other embodiments, perforated wall portions may be formed, or a reduced number of contact points or piers may be formed supporting the article, for example, as would be readily appreciated by those skilled in the art. The release structure 109 also provides a starting structure upon which the three-dimensional article can be built and which is strong enough to provide a stable support during the construction of the article. As shown, the jet 39 moves along path 117 with a vertical firing direction 41 pointed straight down towards the partially constructed release structure 109. In a preferred embodiment, each successive pass or layer is jetted as the jet moves in an opposite direction.

Figure 15B:
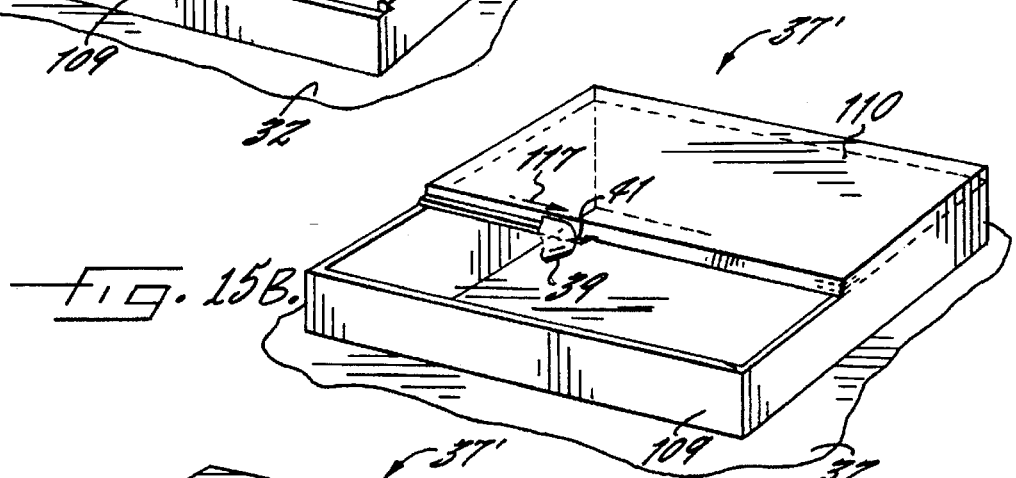
Figure 15C:
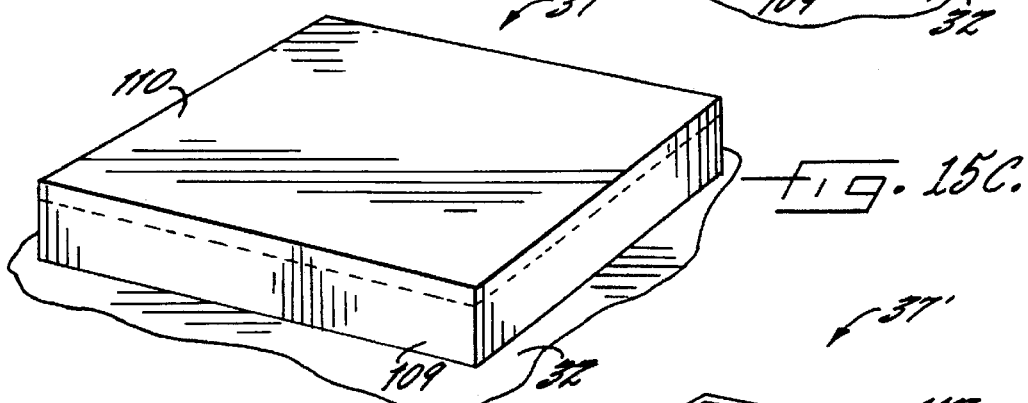

FIG. 15B illustrates the formation of a horizontal wall 110 which will form the bottom surface of the article. The horizontal wall 110 in this embodiment has a horizontal build direction and a three droplet or three segment thickness. Each linear segment is jetted as the jet 39 advances along a path 117 parallel to the edge of the wall with the firing direction 41 oriented at an angle of about 20 degrees from horizontal. As discussed with regard to FIGS. 13 and 14, each segment may be jetted as the jet moves in a direction opposite to the direction from which adjacent segments were jetted. In FIG. 15C, the completed horizontal wall 110 extends across the top of the release structure 109. The dotted lines indicate the extent of the horizontal wall.

Figure 15D:
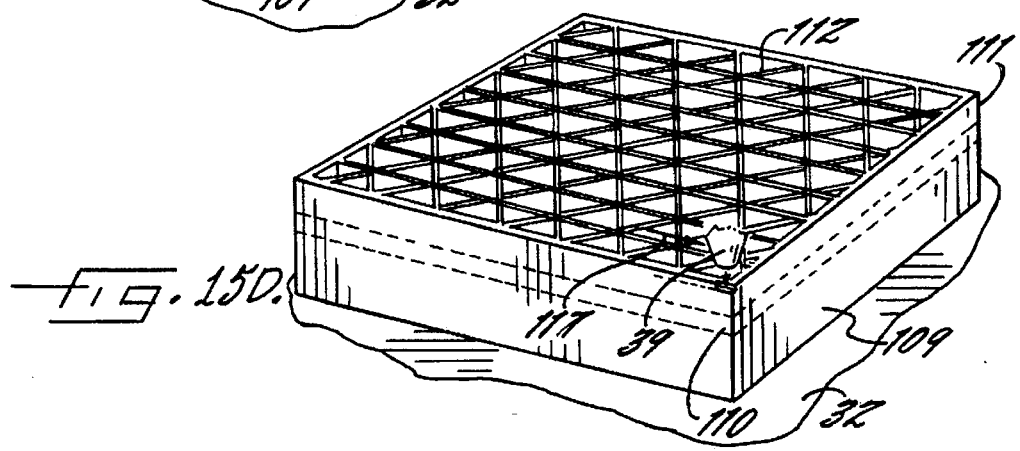

As illustrated in FIG. 15D, vertical walls 111 may be formed upon the horizontal wall 110. These vertical walls 111, which are part of the model or article 37' being constructed, are three droplets or segments thick in the illustrated embodiment. This thickness for the structural parts of the article adds strength and stability to the finished article. An internal hatched wall pattern 112 provides added structural stability and strength to a base portion of the article. The hatching, if desired, may also be extended throughout the interior of the article being formed, thereby adding to the overall strength and stability of the article. To increase overall speed, the hatching may preferably be provided only in the base portion.

The hatched wall pattern 112 may be made to any desired thickness. The hatched wall pattern 112 may be formed at the same vertical rate as the vertical walls 111. Accordingly, a pass or layer may be completed for the vertical walls 111 and the hatched wall pattern 112 before moving on to the next layer for the vertical walls or hatched wall pattern.

FIG. 15E illustrates build rate normalization using a heated body 87. As previously discussed, the heated body or ironing pin 87 may be carried by the jetting head 34. Accordingly, after a predetermined number of passes or layers have been jetted, there may be a need to normalize the outer surface portions of the vertical walls. In a preferred embodiment, the process of build rate normalization occurs after 21 passes or layers of build material have been jetted. Accordingly, a balance is struck between the need for normalization and the time spent performing the operation.

The heated body 87 may comprise aluminum with a Teflon® release coating thereon. The heated body 87 is brought into contact with the upper surface of walls 111 and advanced in a path 118 parallel to the outer surface. In a preferred embodiment, the path 118 is reversed each time the structure is normalized. The heated body 87 causes the build material to melt or reflow. Normalization may not be required for hidden internal structures, such as the hatched pattern of walls for strengthening the base portion of the article. The thermal normalization is further described in copending application Ser. No. 08/326,009 and assigned to the assignee of the present invention, the entire disclosure of which is incorporated herein by reference.

FIG. 15F illustrates the continued building of vertical walls 111. FIG. 15F also illustrates the formation of a hatched structure 112 which fills only the bottom portion of the article.

Figure 15H:
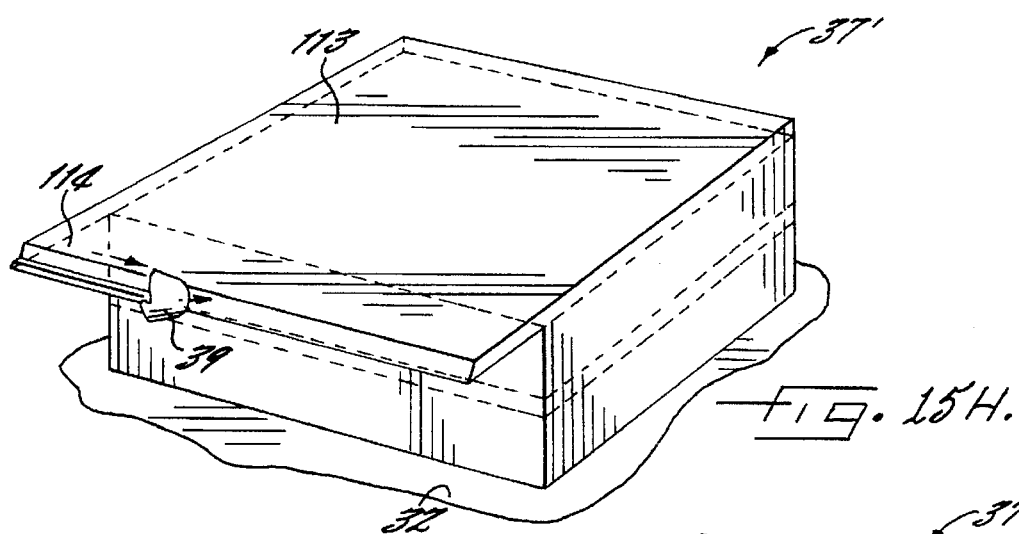
Figure 15I:
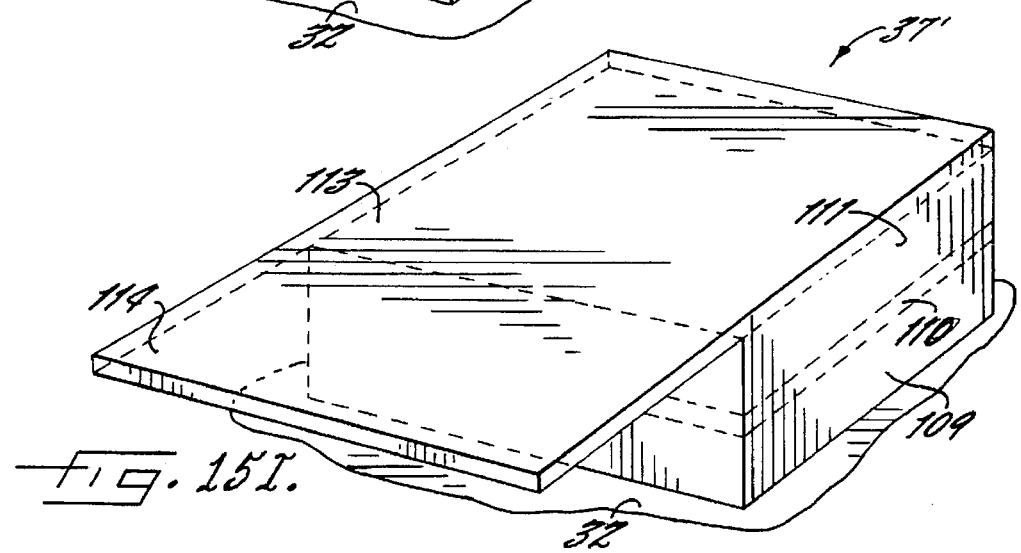

Now referring to FIG. 15G, a second horizontal wall 113 is being built over vertical walls 111. This structure is built using the same techniques described with regard to FIG. 15E. In FIG. 15H, there is illustrated the extension of wall 113 beyond vertical walls 111, creating a cantilevered or unsupported horizontal wall portion 114. This unsupported wall portion 114 is created in the same manner as the previously formed supported portions. The jet 39 continues jetting passes or layers of build material on previous passes or layers. As before, the firing direction 41 is oriented at an angle near horizontal. FIG. 15I illustrates the completion of horizontal wall 113 with the unsupported wall portion 114.

Figure 15J:
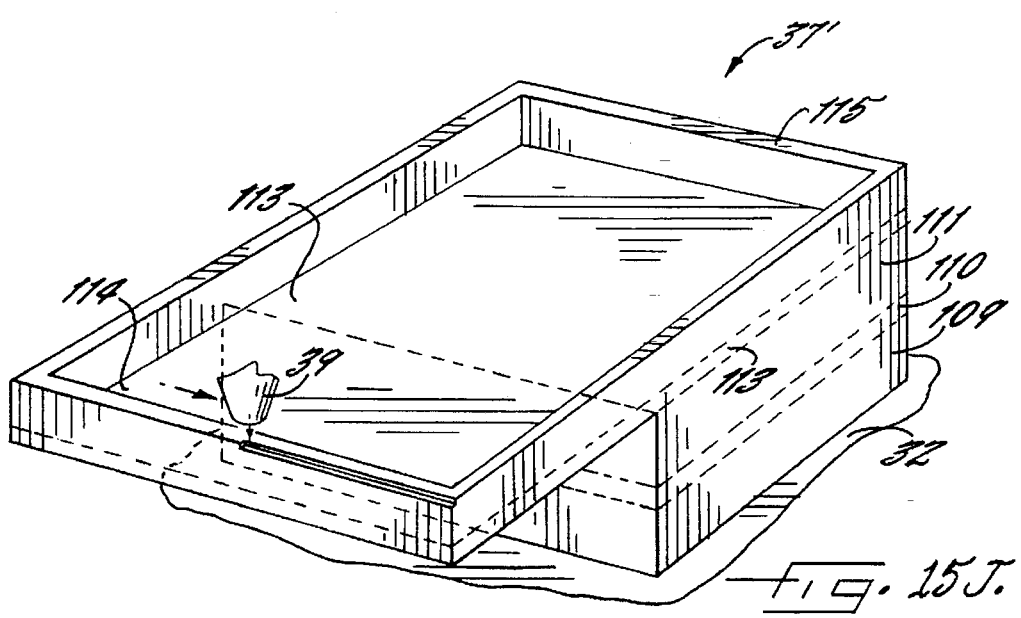
Figure 15K:
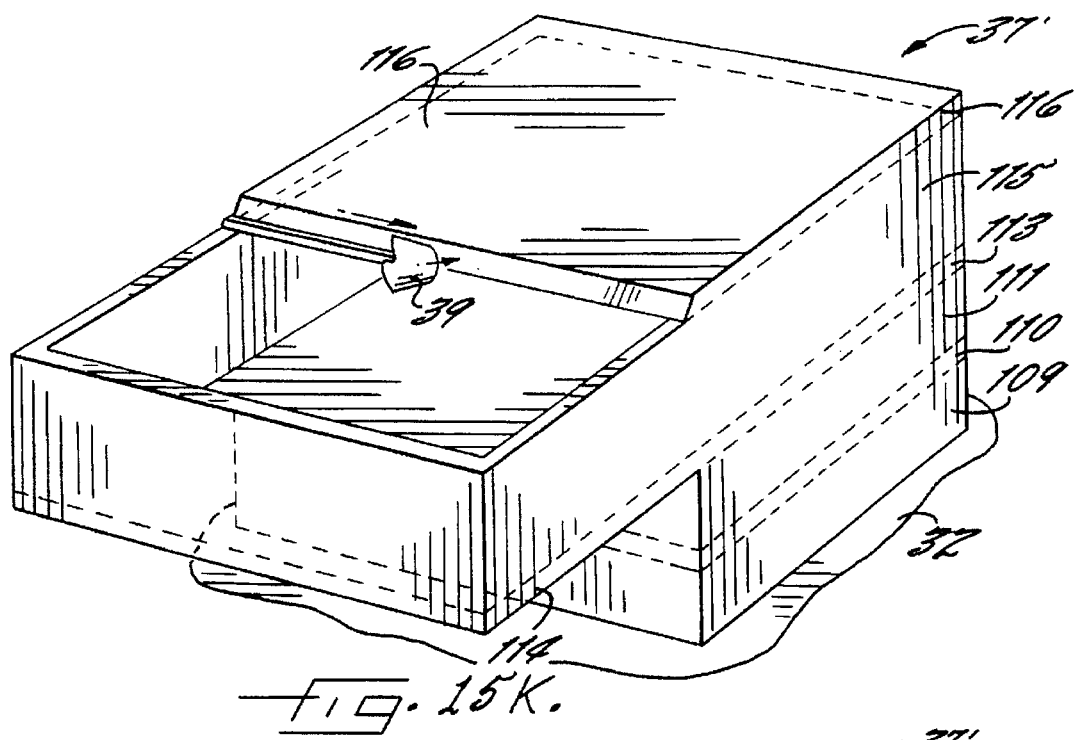
Figure 15L:
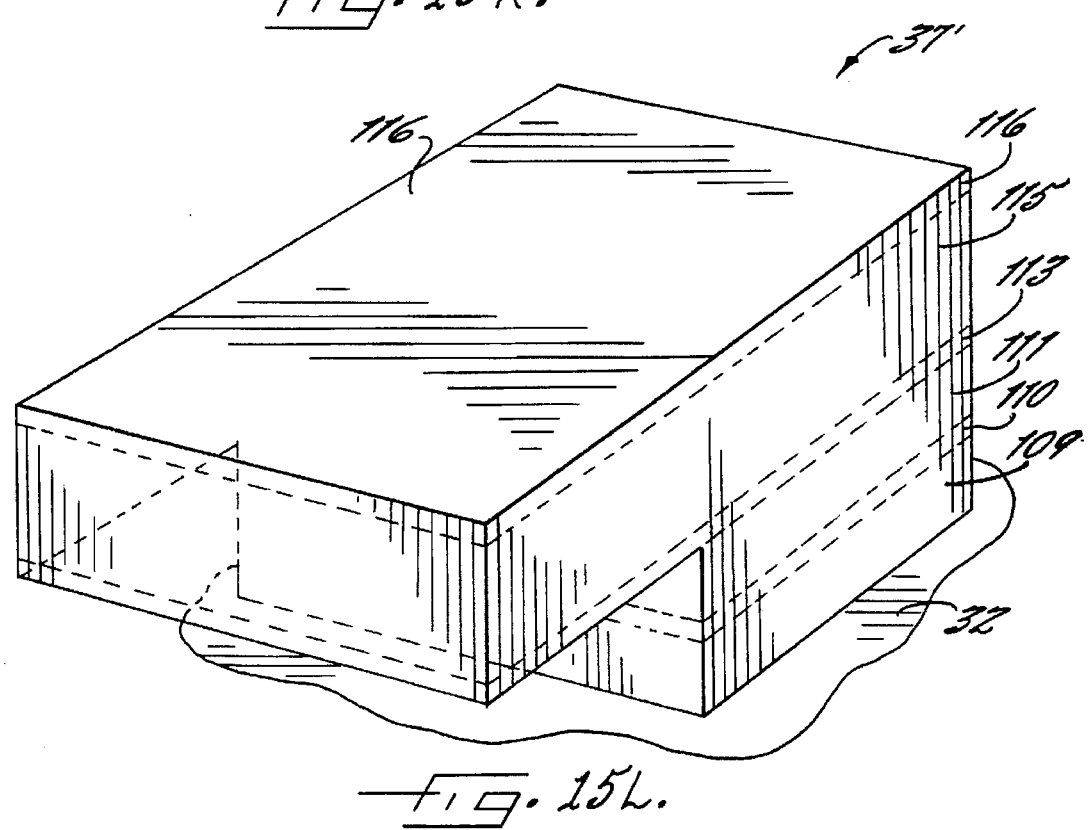

In FIG. 15J, vertical walls 115 are being formed on horizontal wall 113 including unsupported horizontal portion 114. Vertical walls 115 are formed using the same sequence of operations discussed with regard to vertical walls 111 in FIGS. 15D–F. In FIG. 15K, vertical walls 115 have been completed, and the formation of horizontal wall 116 on vertical walls 115 is shown. The formation of this horizontal wall follows the same sequence as discussed with regard to horizontal walls 113 and 110. In FIG. 15L, horizontal wall 116 is complete, thereby completing this portion of the article 37'.

As shown with regard to FIGS. 15A–L, a preferred embodiment of the present invention is capable of forming complex models having unsupported horizontal or cantilevered structures without the need for a surrounding support material. The completed model may be removed from the platform 32 by breaking the release structure 109. The release structure 109 breaks away relatively easily from both the platform 32 and the horizontal wall 110 forming the bottom of the model. Accordingly, the present invention provides a relatively simple and inexpensive way to produce a three-dimensional model or article of high accuracy.

Figure 16:
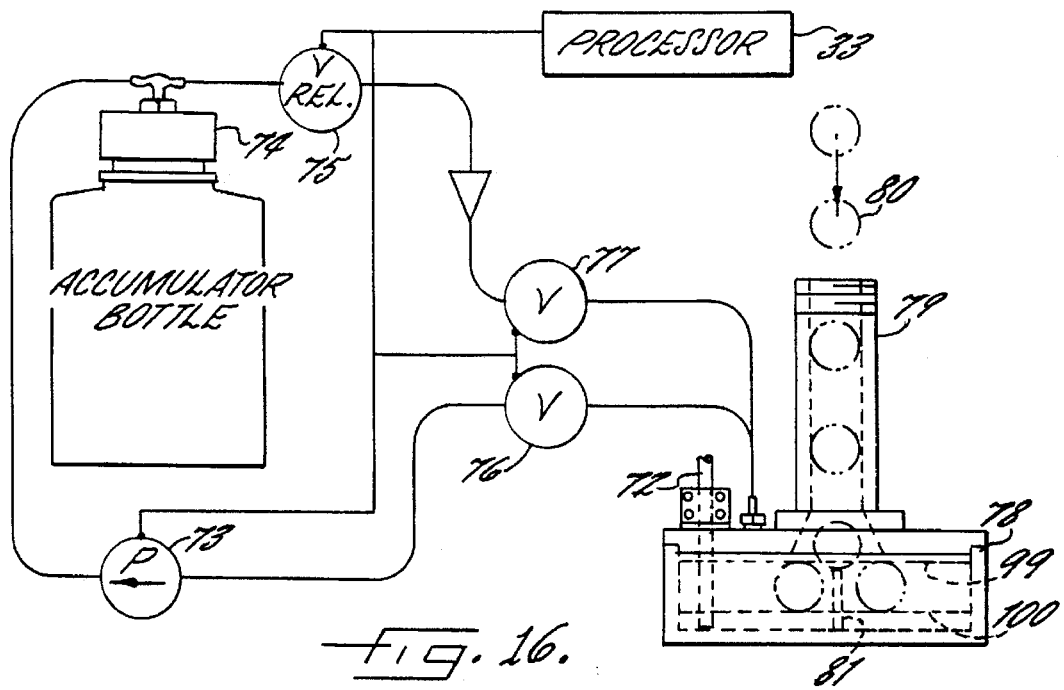
FIG. 16 is a schematic diagram illustrating the build material delivery system according to the invention.

FIG. 16 illustrates the vacuum system used to empty and fill the delivery conduit 72 and jet 39. The vacuum system applies either a vacuum or a pressure to the build material reservoir 78 to either empty or fill the delivery hose 72, jetting head 34, and jet 39. When the system is powered down, it can be useful to empty the build material from the jetting head and delivery hose. Accordingly, fill valve 77 is closed and purge valve 76 is opened. Then, pump 73 applies a vacuum through purge valve 76 to the build material reservoir 78. Accordingly, build material in the conduit 72 and jet 39 is drawn back into the build material reservoir 78. This process allows the heaters in the jetting head 34 and conduit 72 to be turned off without having build material solidify in either the conduit or the jet. The build material reservoir 78 may then be cooled, allowing the build material therein to solidify without harm.

When turning the system on, it is desirable to fill the conduit 72 and jet 39. Accordingly, the purge valve 76 is closed and the fill valve 77 is opened. The pump 73 is then used to create a positive pressure in the accumulator bottle 74. Pressure regulator 75 is used to regulate the pressure that is applied to the build material reservoir 78 through the fill valve 77. After the build material in the reservoir 78 has been heated to form a liquid, and the conduit 72 and jet 39 have both been heated, a progressively increasing or rising pressure waveform is applied to the build material reservoir 78. Accordingly, the liquid build material flows with increasing velocity through the hose 72 towards the jetting head 34. The slowing increasing velocity of the material through the hose 72 causes the leading edge of the build material to form a positive meniscus as it passes through the conduit. This positive or convex meniscus prevents the formation of bubbles in the conduit or jet which could interfere with operation of the piezoelectric jet. When the build material reaches the orifice 40 of the piezoelectric jet 39, the pressure is maintained for a short interval, allowing the build material to stream from the orifice. The pressure waveform then cuts off abruptly, allowing the formation of a negative meniscus at the orifice of the piezoelectric jet without causing an accumulation of build material adjacent the orifice.

The operation of the pump 73, fill valve 77, purge valve 76, and pressure regulator 75 are controlled by the processor 33. Accordingly, emptying and filling operations may occur automatically in response to the power up and power down of the system. In addition, the processor may also determine whether the system is properly powered down or improperly shut off due to a power failure. If the system is properly shut down, the processor will send control signals to empty the conduit and jet. If there is a power failure, normal emptying may not be performed and build material may solidify in the jet and conduit. The processor then initiates emptying and filling prior to permitting normal operation of the jet.

Figures 17A, 17B:
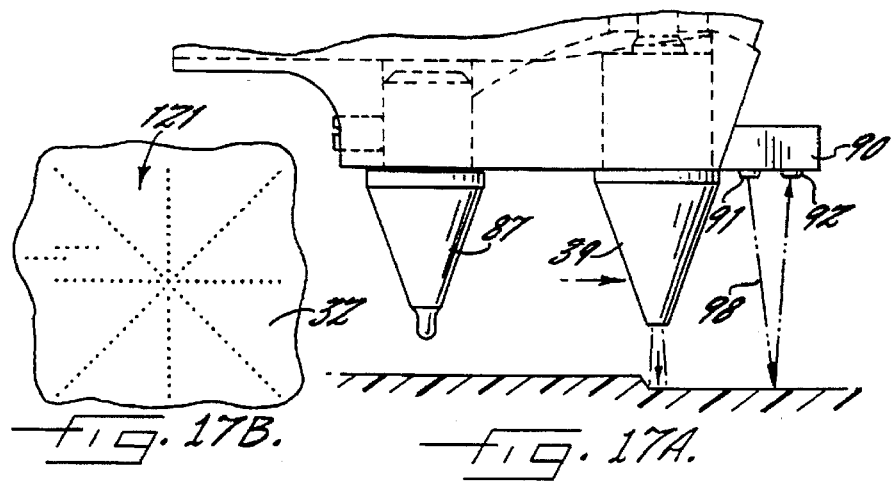
FIG. 17A is a side schematic view of the build material jet head and optical test means according to the invention.
FIG. 17B is a plan view of the optical test pattern as shown in FIG. 17A.

In FIG. 17A, there is illustrated a jetting head 34 having a heated body or ironing pin 87, a piezoelectric jet 39, and an optical detection unit 90. The optical detection unit 90 includes a light emitting diode (LED) 91 and an optical receiver 92. The LED 91 emits a beam 98 of light directed down to the surface being inspected. If the surface has certain reflective characteristics, the beam reflects back up toward the optical receiver 92. The LED 91 and receiver 92 are mounted such that the receiver detects the reflected light from a reflective surface. In this embodiment, the solidified build material has predetermined reflective characteristics such that the beam 98 may detect its presence.

In one embodiment, the piezoelectric jet may jet a predetermined two-dimensional pattern 121 on the platform 32 of the system as illustrated in FIG. 17B. The optical detection unit 90 then scans the pattern 121 to determine the X- and Y-coordinates of each feature on the pattern. The measured coordinates can be compared to the known positions of the jet 39 when jetting the pattern and an analysis of the comparison used to determine X- and Y-axis offsets, for example. The jet 39 may also be used to jet a test pattern having a vertical component so that build rate may be determined or a Z-axis offset determined.

In yet another embodiment, the optical detection unit 90 may be used to restart the build process in the event that the creation of the article is halted before completion. In this embodiment, the optical detection unit is used to determine the status of the build process at the time of the interruption.

The optical detection unit 90 represents an embodiment of test and compensation means for permitting adjustment of a control parameter, such as firing frequency or carriage speed, as would be readily understood by those skilled in the art. In addition, mechanical, electrical or acoustical sensing means could be used to examine a test pattern and, hence, provide the test and compensation means according to the invention.

Figure 18:
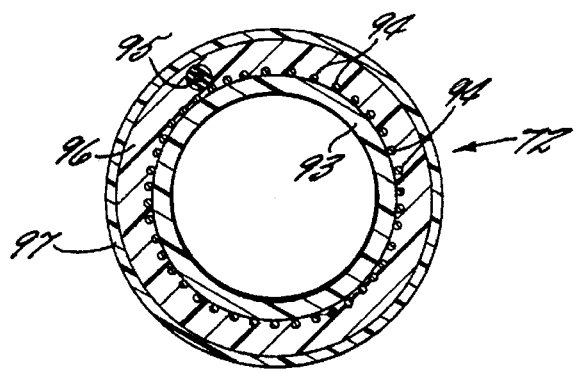
FIG. 18 is a greatly enlarged section view of the heated conduit connecting the build material reservoir and the build material jet.

FIG. 18 illustrates a cross-section of the build material conduit 72 which includes a flexible interior tubing 93, formed of a durable material such as Vitron™. The interior is surrounded by a thermally conductive material layer, such as a wire mesh braid 94. In a preferred embodiment, the conductive material is a copper braid. An insulated electrically resistive wire heating element 95 is wrapped around the wire mesh braid 94 in a spiral fashion. The resistive wire may comprise a nichrome wire surrounded by an insulating material. The conduit 72 is thus uniformly heated by passing a current through the resistive wire. The braided layer 94 and resistive wire heating element 95 are surrounded by an insulating material layer 96, such as fiberglass. The complete structure is then encased in heat-shrink tubing 97. In a preferred embodiment, this predetermined temperature is greater than the melting point of the build material. Accordingly, build material within the conduit 72 can be maintained as a liquid.

Figure 19:
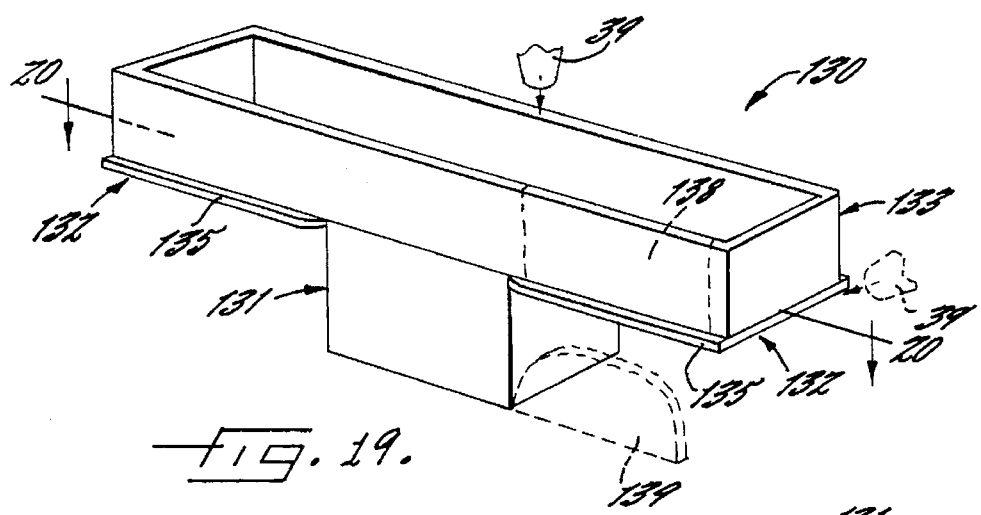
FIG. 19 is a perspective view of an article including enhanced target landing point areas in accordance with the present invention.
Figure 20:
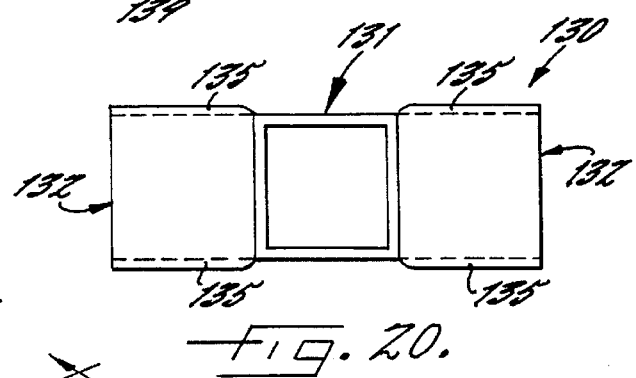
FIG. 20 is a cross-section view of the article taken along lines 20—20 of FIG. 19.

Referring now additionally to FIGS. 19 and 20, another significant aspect of the present invention is explained. In making an arbitrary three-dimensional article as described extensively above, high precision is desirable in positioning the jet 39. While high precision may be obtained in accordance with the above described apparatus 30 and related methods, certain errors, such as misalignments or build material drift may occur, such as, for example, when constructing adjacent portions of an article which require repositioning of the jet 39. A misalignment or error may become more significant upon consideration of the relatively small wall thickness, on the order of 0.021 inches. A typical misalignment may be on the order of 0.002 inches. Moreover, if a portion of jetted build material its target landing point a gap or other deformation may be formed in an article. The resultant gap or deformation may then be propagated throughout the article.

Accordingly, the processor, which is operatively connected to dispensing means for constructing the article based upon the article defining data, preferably includes target landing point enhancing means. The target landing point enhancing means operates the dispensing means to construct an enlarged surface of a first article portion to thereby define an enhanced target landing point area for ejected droplets of build material for constructing a second article portion adjacent the first article portion. The dispensing means is preferably a jet 39 as shown in the illustrated embodiment, although other dispensers are also contemplated by the present invention.

The enlarged or enhanced target landing point areas 135 are shown greatly exaggerated in size in FIGS. 19 and 20 for greater ease of understanding. More particularly, the illustrated article 130 includes a square bottom 131 formed by four vertically extending walls. A pair of horizontal walls 132 extend outwardly from opposite upper sides of the bottom 131. These horizontal walls include enhanced target landing point areas 135 integrally formed on the outer side edges of the horizontal walls 132 as further shown by the dotted lines of FIG. 20.

The enhanced target landing point areas 135 permit a slight misalignment or error that may occur between adjacent article portions—in the illustrated embodiment, between the horizontal walls 132 and the vertical rectangular article portion 133 positioned thereon. If a misalignment or error occurred without the enhanced target landing point areas 135 of the present invention, ejected droplets of build material intended to form the rectangular article portion 133 may miss their intended target positions. Accordingly, an opening or gap 138 (illustrated in dotted lines) may be formed in the rectangular article portion 133 and leave an accumulation of build material 139 (also illustrated in dotted lines) in an undesired position.

The target landing point enhancing means preferably comprises enhancement determining means for determining placement of the enhanced target landing point area based upon the article defining data and also preferably based upon a change in a firing direction for the jet 39 (FIG. 19) as needed to construct the rectangular article portion 133 on the horizontal walls 132 in the illustrated embodiment. In addition, the target landing point enhancing means also preferably includes means for constructing the enhanced target landing point area 135 at a same jet firing direction as for constructing an adjacent surface of the first article portion. As shown in the illustrated embodiment, the horizontal walls 132 define planar surfaces adjacent the rectangular article portion 133 and, accordingly, the target landing point enhancing means includes means for enlarging the planar surface of the horizontal walls along respective planes defined by the planar surfaces. Enlarged surfaces may also be formed that are not generally aligned with a plane defined by the adjacent article portion as would be readily understood by those skilled in the art.

The processor preferably includes means for forming the each article portion having a predetermined wall thickness. Moreover, the target landing point enhancing means preferably includes means for operating the jet 39 to construct the enlarged surface of a first article portion in a range of about 10 to 50 percent of the predetermined wall thickness of the second article portion. Accordingly, for a wall thickness of about 0.021 inches, the enhanced target landing point areas 135 may be relatively small and in the range of about 0.001 to 0.010 inches. Accordingly, the overall appearance of the article 130 is not adversely affected by the target landing point enhancing means of the present invention.

As would be readily understood by those skilled in the art, the target landing point enhancing means may be used for many different configurations of adjacent article portions, particularly where a change in firing direction of the jet is desired.

Referring now additional to FIGS. 21 to 25b, yet another beneficial aspect of the present invention is explained. More particularly, the processor preferably further includes shadow avoiding means for operating the jet 39 to construct adjacent article portions so that a jet firing path for constructing one article portion is unobstructed by a previously constructed part of another article portion.

Figure 21:
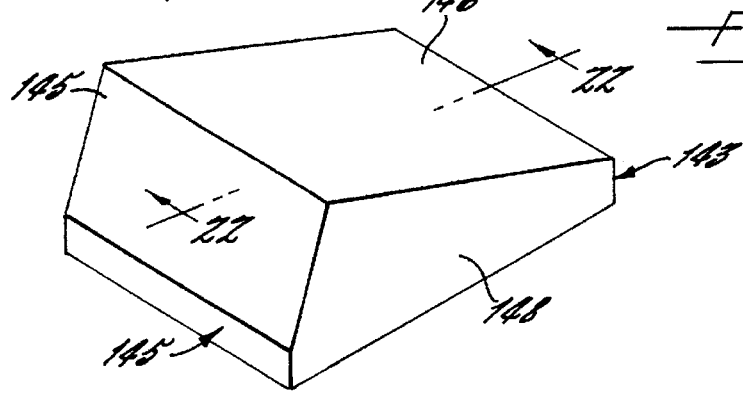
FIG. 21 is a perspective view of an article formed using shadow avoidance according to another aspect of the invention.
Figure 22:
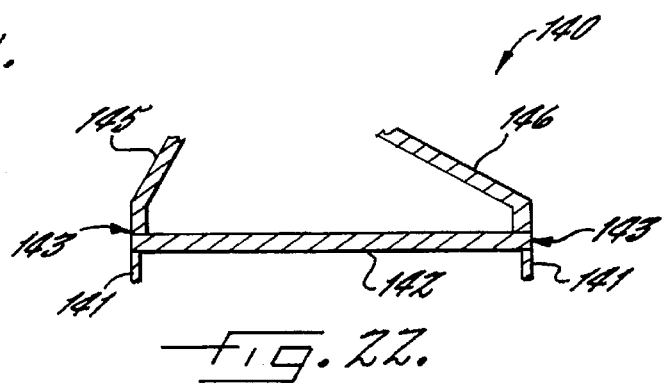
FIG. 22 is a cross-section view of the article taken along lines 22—22 of FIG. 21.

Referring more particularly to FIGS. 21 and 22, an article in the form of a ramp 140 is used to illustrate an example of shadow avoidance according to the invention. The ramp 140 includes a lower release portion 141 and a horizontal bottom wall 142 connected thereto. Front and rear generally vertically extending walls are defined by additional portions of the ramp 140 as illustrated. A pair of intersecting generally planar walls 145, 146 extend upward to form the upper portion of the ramp 140. The front wall 145 is inclined at an angle of about 20° from vertical and the back wall 146 is inclined at about 70° from vertical in the illustrated embodiment. A pair of opposing side walls 148 close the sides of the ramp 140.

Figure 23A:
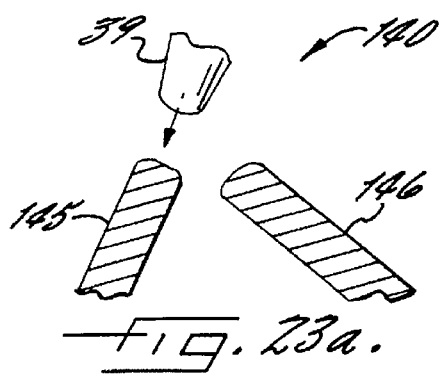
FIGS. 23a and 23b are greatly enlarged cross-sectional views of an upper corner portion of the article shown in FIGS. 21 and 22 and illustrate one embodiment for forming the corner while avoiding shadowing according to another aspect of the invention.

In one embodiment, the shadow avoiding means preferably comprises sequencing means for constructing a part of the first article portion to a predetermined extent, for then completing construction of the second article portion, and for then completing construction of the remaining part of the first portion. Referring additionally to FIG. 23a, a part of the front wall 145 is constructed with a firing direction aligned with the firing direction of the build material jet 39 to a predetermined extent that will not obstruct construction of the back wall 146. In other words, before completing the front wall 145, construction thereof is stopped short, such as to account for a predetermined overbuild of several percent which may be desirable to prevent voids in the article.

Figure 23B:
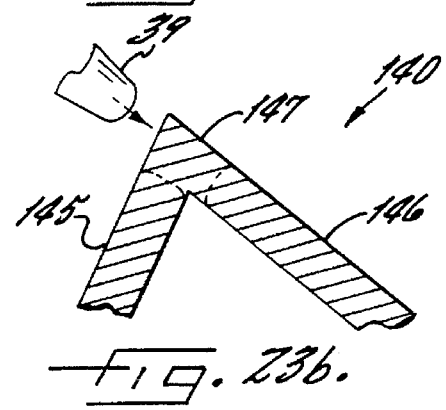

As shown in FIG. 23b, the remainder 147 of the ramp 140 may be built along the jet firing direction and the aligned build direction for the back wall 146. In other words, the remaining part of the back wall 146 is constructed along with the remaining part of the front wall 145.

Figure 24A:
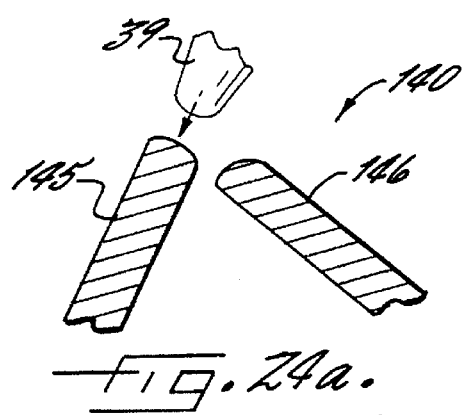
FIGS. 24a and 24b are greatly enlarged cross-sectional views of an upper corner portion of the article shown in FIGS. 21 and 22 and illustrate a second embodiment for forming the corner while avoiding shadowing according to another aspect of the invention.
Figure 24B:
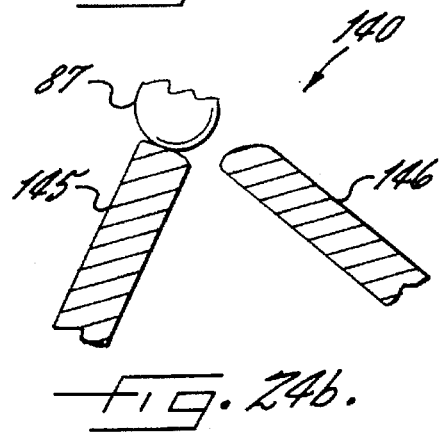

Referring additionally to FIGS. 24a and 24b, another variation of the shadow avoidance aspect of the present invention is explained. The apparatus 30 preferably includes normalization means for normalizing a predetermined part of the article during construction thereof as described above. The normalization means periodically ensures that the dimensions of the article are accurate relative to a predetermined coordinate system. Accordingly, the shadow compensation means may include normalization control means for operating the normalization means to displace an overbuilt part of the front wall that would otherwise block or obstruct a jet firing path for constructing the back wall. The normalization means is preferably thermal normalization means provided by a heated body 87 carried and positioned by the jet positioning means of the dispensing head 34. After removing the overbuilt part of the front wall 145 using the heated body 87, the ramp 140 may be completed by positioning the jet 39 to complete the back wall and front wall as shown in FIG. 23b.

Figure 25A:
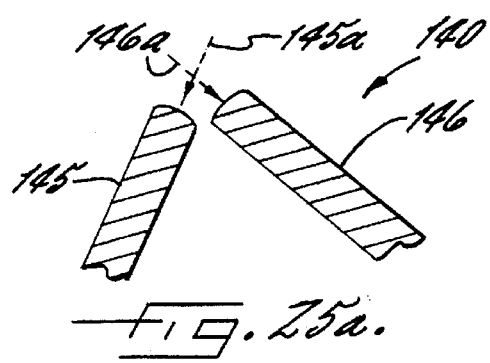
FIGS. 25a and 25b are greatly enlarged cross-sectional views of an upper corner portion of the article shown in FIGS. 21 and 22 and illustrate a third embodiment for forming the corner while avoiding shadowing according to another aspect of the invention.
Figure 25B:
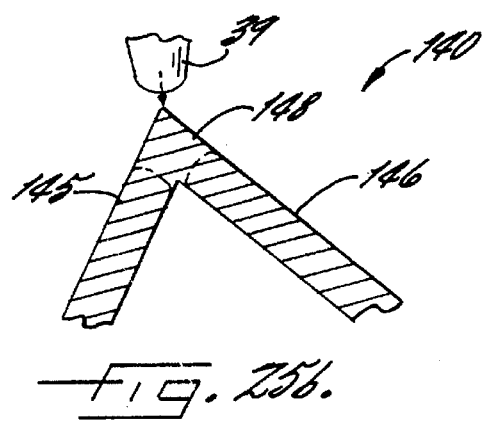

A third variation of shadow avoidance is illustrated with additional reference to FIGS. 25a and 25b. The front and back walls 145, 146 are constructed from respective first and second jet firing directions 145a, 146a. The shadow avoiding means in this variation or embodiment comprises jet firing direction control means for forming an intersection 148 between the front and back walls by orienting the jet 39 to have a jet firing direction between the first and second jet firing directions 145a, 146a.

As would be readily understood by those skilled in the art, the illustrated variations of the shadow avoidance means may be used independently or combined with each other. For example, a combination of controlling the build sequence may be desirably used with the thermal normalization control to remove obstructing or shadowing portions of the article. As would also be readily understood by those skilled in the art, the shadow avoidance embodiments may be used independently or combined with the enhanced target landing point areas as also described herein. Accordingly, a highly accurate finished three-dimensional article may be produced according to the invention.

Returning again to FIGS. 19 and 20, a first embodiment of a method for making a three-dimensional article based upon article defining data preferably includes the steps of: dispensing a plurality of droplets of build material from a build material dispenser and toward target landing points; and constructing the article based upon the article defining data by operating the dispenser to construct an enlarged surface of a first article portion defining an enhanced target landing point area and operating the dispenser to construct a second article portion adjacent the first article portion. The step of constructing the article preferably comprises the step of advancing the dispenser along a predetermined path of travel relative to a platform in three directions and relatively rotatably positioning the dispenser about two axes thereby defining five degrees of freedom of movement for the dispenser relative to the platform.

Referring again to FIGS. 21–25b, another method aspect of the present invention is for making a three-dimensional article based upon article defining data, and while avoiding shadowing. More particularly, the method preferably includes the steps of: dispensing a plurality of droplets of build material from a build material dispenser and toward target landing points; and constructing the article based upon the article defining data by operating the dispenser to construct first and second adjacent article portions so that a dispensing path for constructing the first article portion is unobstructed by a previously constructed part of the second article portion to thereby avoid shadowing of construction of the first article portion by a previously constructed part of the second article portion.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for making a three-dimensional article based upon article defining data, said apparatus comprising:
    a platform;
    build material dispensing means positioned adjacent said platform for dispensing a plurality of droplets of build material toward target landing points; and
    a processor operatively connected to said dispensing means for constructing an article based upon the article defining data, said processor comprising target landing point enhancing means for operating said dispensing means for constructing an enlarged surface contiguous with a first article portion to define an enhanced target landing point area for dispensed droplets of build material for constructing a second article portion adjacent the first article portion.

2. An apparatus according to claim 1 wherein said dispensing means comprises:
    a build material jet; and
    jet positioning means for advancing said jet along a predetermined path of travel relative to said platform in three directions and relatively rotatably positioning said jet about two axes thereby defining five degrees of freedom of movement for said jet relative to said platform.

3. An apparatus according to claim 2 wherein said target landing point enhancing means comprises enhancement determining means for determining placement of the enhanced target landing point area based upon the article defining data and a change in a jet firing direction needed to construct the second article portion adjacent the first article portion.

4. An apparatus according to claim 2 wherein said target landing point enhancing means comprises means for constructing the enhanced target landing point area at a same jet firing direction as for constructing an adjacent surface of the first article portion.

5. An apparatus according to claim 2 wherein said jet positioning means for relatively positioning said jet with respect to said platform comprises:
    Z-direction positioning means for positioning said jet and said platform vertically relative to one another;
    X–Y positioning means for positioning said jet and said platform in an X–Y planar direction relative to one another;
    flip angle positioning means for rotatably positioning said jet relative to an axis generally parallel to said platform; and
    phi angle positioning means for rotatably positioning said jet relative to an axis generally perpendicular to said platform.

6. An apparatus according to claim 2 wherein said processor comprises means for controlling said positioning means so that said jet is located a predetermined distance from respective target landing points of the droplets of build material as said jet is advanced along the predetermined path of travel.

7. An apparatus according to claim 1 wherein the first article portion has a planar surface adjacent the second article portion, and wherein said target landing point enhancing means comprises means for enlarging the planar surface of the first article portion along the plane defined by the planar surface.

8. An apparatus according to claim 1 wherein said processor includes means for forming the second article portion having a predetermined wall thickness, and wherein said target landing point enhancing means comprises means for operating said dispensing means to construct the enlarged surface of the first article portion in a range of about 10 to 50 percent of the predetermined wall thickness of the second article portion.

9. An apparatus according to claim 1 wherein said processor further comprises shadow avoiding means for operating said dispensing means to construct third and fourth adjacent article portions so that a dispensing path for constructing the third article portion is unobstructed by a previously constructed part of the fourth article portion.

10. An apparatus for making a three-dimensional article based upon article defining data, said apparatus comprising:
    a platform;
    a build material jet for ejecting a plurality of droplets of build material toward target landing points;
    jet positioning means for advancing said jet along a predetermined path of travel relative to said platform in three directions and relatively rotatably positioning said jet about two axes thereby defining five degrees of freedom of movement for said jet relative to said platform; and
    a processor operatively connected to said dispensing means for constructing an article based upon the article defining data, said processor comprising target landing point enhancing means for operating said jet for constructing an enlarged surface contiguous with a first article portion to define an enhanced target landing point area for ejected droplets of build material for constructing a second article portion adjacent the first article portion, said target landing point enhancing means comprising enhancement determining means for determining placement of the enhanced target landing point area based upon the article defining data and a change in a jet firing direction needed to construct the second article portion adjacent the first article portion.

11. An apparatus according to claim 10 wherein said target landing point enhancing means comprises means for constructing the enhanced target landing point area at a same jet firing direction as for constructing an adjacent surface of the first article portion.

12. An apparatus according to claim 10 wherein the first article portion has a planar surface adjacent the second article portion, and wherein said target landing point enhancing means comprises means for enlarging the planar surface of the first article portion along the plane defined by the planar surface.

13. An apparatus according to claim 10 wherein said processor includes means for forming the second article portion having a predetermined wall thickness, and wherein said target landing point enhancing means comprises means for operating said jet to construct the enlarged surface of the first article portion in a range of about 10 to 50 percent of the predetermined wall thickness of the second article portion.

14. An apparatus according to claim 10 wherein said jet positioning means for relatively positioning said jet with respect to said platform comprises:

Z-direction positioning means for positioning said jet and said platform vertically relative to one another;

X-Y positioning means for positioning said jet and said platform in an X-Y planar direction relative to one another;

flip angle positioning means for rotatably positioning said jet relative to an axis generally parallel to said platform; and phi angle positioning means for rotatably positioning said jet relative to an axis generally perpendicular to said platform.

15. An apparatus according to claim 10 wherein said processor comprises means for controlling said jet positioning means so that said jet is located a predetermined distance from respective target landing points of the droplets of build material as said jet is advanced along the predetermined path of travel.

16. An apparatus according to claim 10 wherein said processor further comprises shadow avoiding means for operating said dispensing means to construct third and fourth adjacent article portions so that a jet firing path for constructing the third article portion is unobstructed by a previously constructed part of the fourth article portion.

17. An apparatus for making a three-dimensional article based upon article defining data, said apparatus comprising:

a platform;

build material dispensing means positioned adjacent said platform for dispensing a plurality of droplets of build material toward target landing points; and a processor operatively connected to said dispensing means for constructing an article based upon the article defining data, said processor comprising shadow avoiding means for operating said dispensing means to construct first and second adjacent article portions so that a dispensing path for constructing the first article portion is unobstructed by a previously constructed part of the second article portion.

18. An apparatus according to claim 17 wherein said dispensing means comprises:

a build material jet; and jet positioning means for advancing said jet along a predetermined path of travel relative to said platform in three directions and relatively rotatably positioning said jet about two axes thereby defining five degrees of freedom of movement for said jet relative to said platform.

19. An apparatus according to claim 18 wherein said shadow avoidance means comprises sequencing means for constructing a part of the second article portion to a predetermined extent before completing construction of the first article portion and a remaining part of the second article portion.

20. An apparatus according to claim 18 wherein the first and second article portions are constructed from respective first and second jet firing directions, and wherein said shadow enhancing means comprises jet firing direction control means for forming an intersection between the first and second article portions by orienting said jet to have a jet firing direction between the first and second jet firing directions.

21. An apparatus according to claim 18 further comprising normalization means for normalizing a predetermined part of the article during construction thereof, and wherein said shadow avoidance means comprises normalization control means for operating said normalization means to displace a part of the second article portion that would otherwise obstruct a jet firing path for constructing the first article portion.

22. An apparatus according to claim 21 wherein said normalization means comprises thermal normalization means for selectively melting ejected and solidified build material.

23. An apparatus according to claim 18 wherein said jet positioning means for relatively positioning said jet with respect to said platform comprises:

Z-direction positioning means for positioning said jet and said platform vertically relative to one another;

X-Y positioning means for positioning said jet and said platform in an X-Y planar direction relative to one another;

flip angle positioning means for rotatably positioning said jet relative to an axis generally parallel to said platform; and phi angle positioning means for rotatably positioning said jet relative to an axis generally perpendicular to said platform.

24. An apparatus according to claim 18 wherein said processor comprises means for controlling said positioning means so that said jet is located a predetermined distance from respective target landing points of the droplets of build material as said jet is advanced along the predetermined path of travel.

25. An apparatus for making a three-dimensional article based upon article defining data, said apparatus comprising:

a platform;

build material dispensing means positioned adjacent said platform for dispensing a plurality of droplets of build material toward target landing points;

normalization means for normalizing a predetermined part of the article during construction thereof; and a processor operatively connected to said dispensing means for constructing an article based upon the article defining data, said processor comprising shadow avoiding means for operating said dispensing means and said normalization means to construct first and second adjacent article portions so that a dispensing path for constructing the first article portion is unobstructed by a previously constructed part of the second article portion, said shadow avoidance means comprising normalization control means for operating said normalization means to displace a part of the second article portion that would otherwise obstruct a dispensing path for constructing the first article portion.

26. An apparatus according to claim 25 wherein said dispensing means comprises:

a build material jet; and jet positioning means for advancing said jet along a predetermined path of travel relative to said platform in three directions and relatively rotatably positioning said jet about two axes thereby defining five degrees of freedom of movement for said jet relative to said platform.

27. An apparatus according to claim 26 wherein said jet positioning means for relatively positioning said jet with respect to said platform comprises:

Z-direction positioning means for positioning said jet and said platform vertically relative to one another;

X-Y positioning means for positioning said jet and said platform in an X-Y planar direction relative to one another;

flip angle positioning means for rotatably positioning said jet relative to an axis generally parallel to said platform; and phi angle positioning means for rotatably positioning said jet relative to an axis generally perpendicular to said platform.

28. An apparatus according to claim 26 wherein said processor comprises means for controlling said positioning means so that said jet is located a predetermined distance from respective target landing points of the droplets of build material as said jet is advanced along the predetermined path of travel.

29. An apparatus according to claim 25 wherein said normalization means comprises thermal normalization means for selectively melting dispensed and solidified build material.

30. An apparatus according to claim 25 wherein said shadow avoidance means comprises sequencing means for constructing a part of the second article portion to a predetermined extent before completing construction of the first article portion and a remaining part of the second article portion.

31. An apparatus according to claim 25 wherein the first and second article portions are constructed from respective first and second dispensing directions, and wherein said shadow enhancing means comprises dispenser direction control means for forming an intersection between the first and second article portions by orienting said dispensing means to have a dispensing direction between the first and second dispensing directions.

* * * * *